US012747858B2

(12) United States Patent

Oqab et al.

(10) Patent No.: US 12,747,858 B2

(45) Date of Patent: Sep. 29, 2026

(54) SYSTEMS AND METHODS FOR HEATING OF DISPERSED METALLIC PARTICLES

(71) Applicant: Oqab Dietrich Induction Inc., Kitchener (CA)

(72) Inventors: Haroon B. Oqab, Kitchener (CA); George B. Dietrich, Kitchener (CA); Jean-Pierre Hickey, Waterloo (CA); Joseph Mouallem, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 935 days.

(21) Appl. No.: 17/918,248

(22) PCT Filed: Apr. 12, 2021

(86) PCT No.: PCT/CA2021/050489

§ 371 (c)(1),
(2) Date: Oct. 11, 2022

(87) PCT Pub. No.: WO2021/203211

PCT Pub. Date: Oct. 14, 2021

(65) Prior Publication Data

US 2023/0141851 A1 May 11, 2023

Related U.S. Application Data

(60) Provisional application No. 63/008,015, filed on Apr. 10, 2020.

(51) Int. Cl.

*F23B 99/00* (2006.01)
*F23K 3/02* (2006.01)

(Continued)

(52) U.S. Cl.

CPC ................ *F23B 99/00* (2013.01); *F23K 3/02* (2013.01); *F23Q 13/00* (2013.01); *H05B 6/06* (2013.01);

(Continued)

(58) Field of Classification Search

CPC ......... F23Q 13/00; F24S 10/753; F24S 10/95; F24S 80/20; F23B 99/00;

(Continued)

(56) References Cited

U.S. PATENT DOCUMENTS

2003/0185995 A1* 10/2003 Miyamoto ................ C23C 4/12 427/446
2005/0095168 A1 5/2005 Centanni et al.

(Continued)

FOREIGN PATENT DOCUMENTS

WO 2017186437 A1 11/2017
WO 2017195107 A2 11/2017

OTHER PUBLICATIONS

CIPO as ISA, International Search Report and Written Opinion for PCT/CA2021/050489, Jun. 21, 2022.

*Primary Examiner* — Hung D Nguyen

(74) *Attorney, Agent, or Firm* — Own Innovation Inc.; James W. Hinton; Daniel B. Biggs

(57) ABSTRACT

A system and method for inductive heating of dispersed metallic particles is provided. The method includes: providing a particle-laden flow comprising a carrier phase comprising a carrier fluid and a dispersed phase comprising the dispersed metallic particles; exposing the dispersed metallic particles to a magnetic field for heating the dispersed metallic particles via at least one of hysteresis and Joules heating mechanisms; inductively heating the dispersed metallic particles in the particle-laden flow via the magnetic field; and controlling a flow configuration of the particle-laden flow by (Continued)

adjusting a flow parameter, the flow parameter being any one or more of an induction heating timescale, a particle thermal timescale, a heat diffusion in the carrier phase, and a particle clustering of the dispersed metallic particles.

20 Claims, 26 Drawing Sheets

(51) Int. Cl.

| | |
|---|---|
| ***F23Q 13/00*** | (2006.01) |
| ***H05B 6/06*** | (2006.01) |
| ***H05B 6/10*** | (2006.01) |

(52) U.S. Cl.
CPC ...... *H05B 6/10* (2013.01); *F23B 2900/00003* (2013.01); *F23K 2203/008* (2013.01)

(58) Field of Classification Search
CPC ... F23B 2900/00003; H05B 6/06; H05B 6/10; H05B 6/108; H05B 2206/023; F23K 3/02; F23K 2203/008; Y02E 10/44; Y02E 10/46
See application file for complete search history.

(56) References Cited

U.S. PATENT DOCUMENTS

| | | | | |
|---|---|---|---|---|
| 2013/0076158 | A1 | 3/2013 | Motisse | |
| 2015/0316328 | A1 | 11/2015 | Trainham et al. | |
| 2021/0270210 | A1* | 9/2021 | Oqab | F02K 9/44 |

* cited by examiner

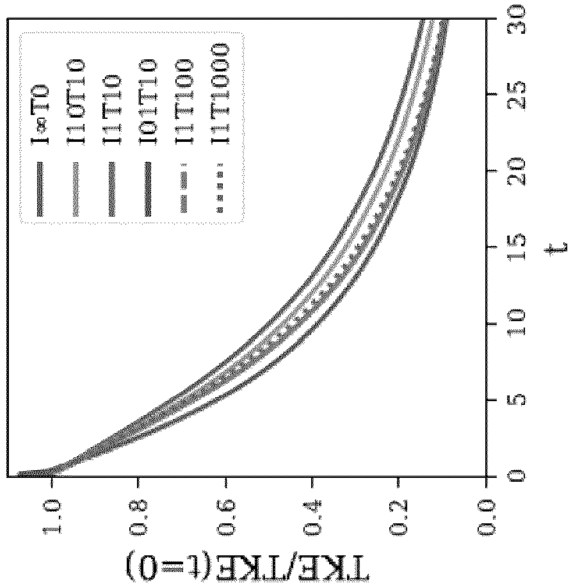
FIG. 3A
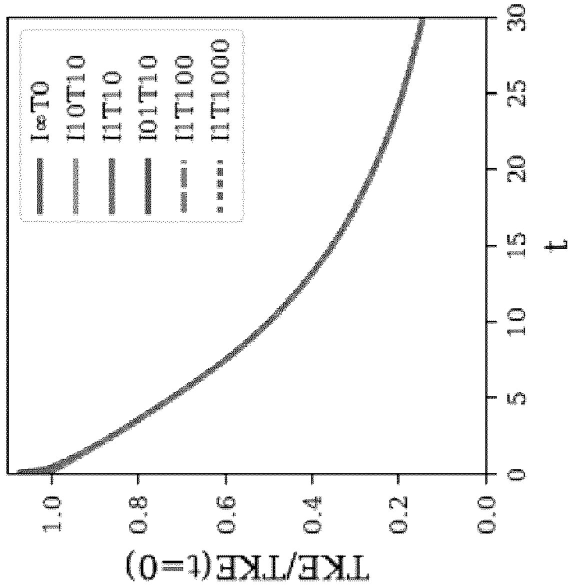
FIG. 3B
FIG. 3

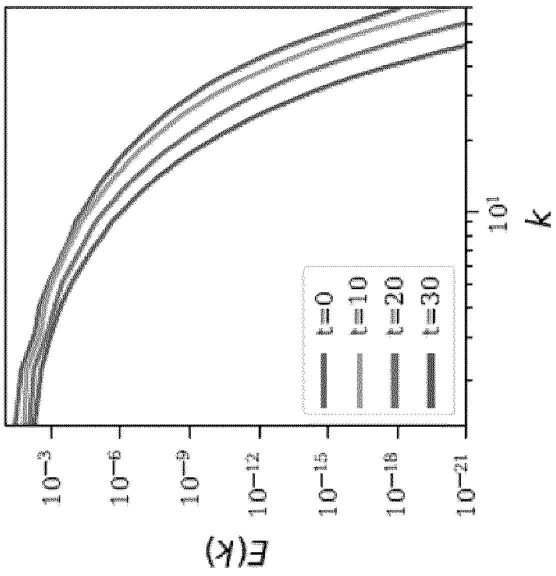
FIG. 5A
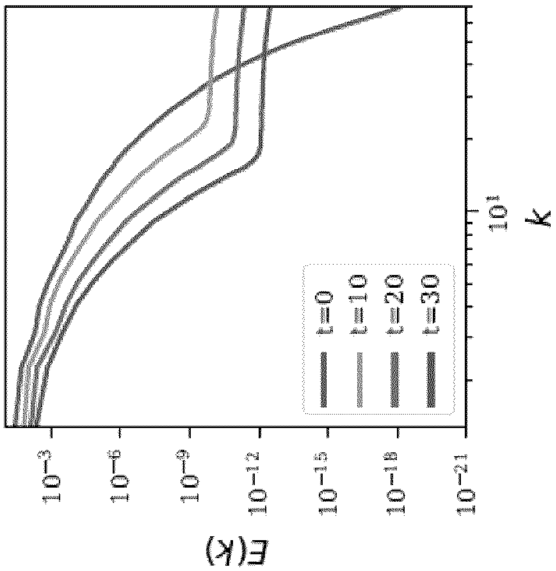
FIG. 5B
FIG. 5

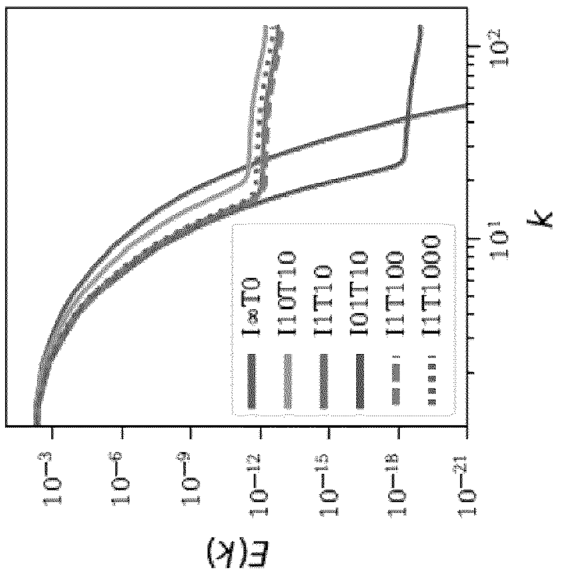
FIG. 6A
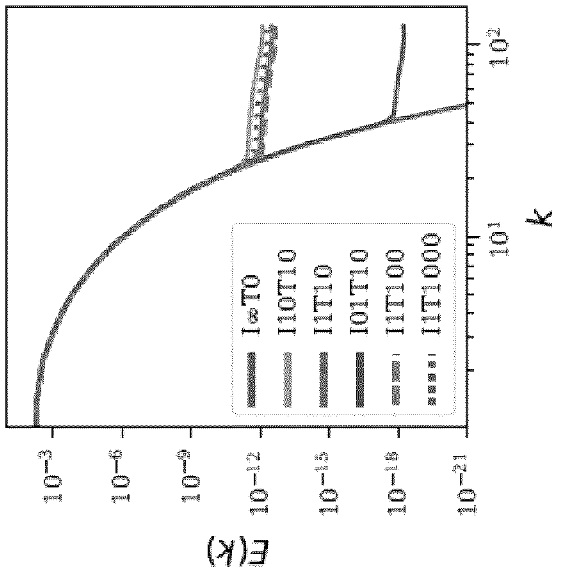
FIG. 6B
FIG. 6

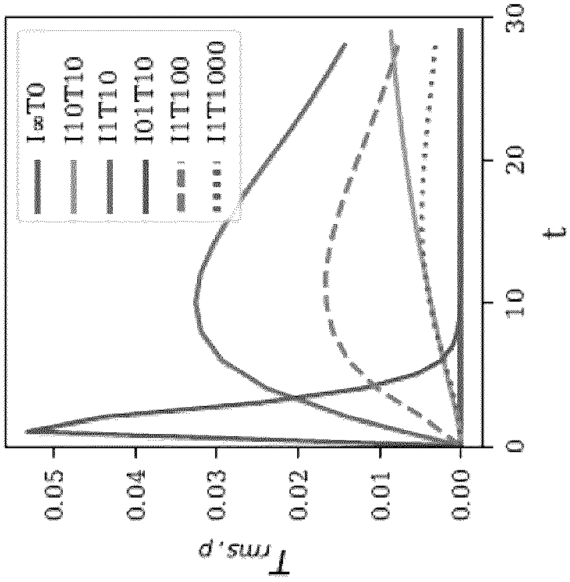
FIG. 7B
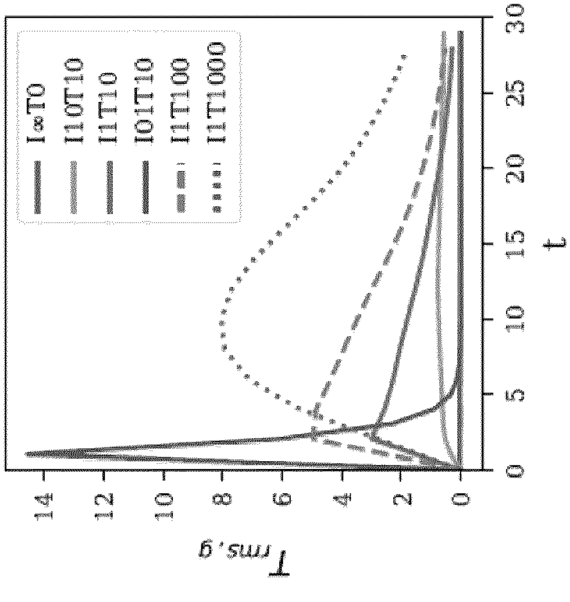
FIG. 7A
FIG. 7

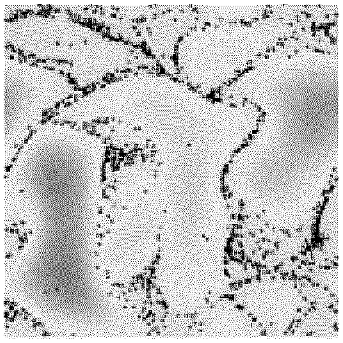
(a)
FIG. 8A
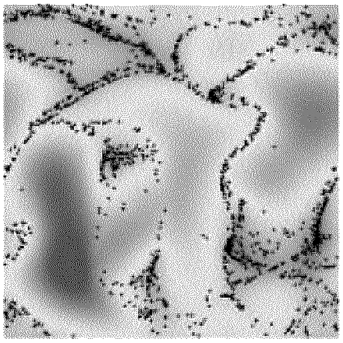
(b)
FIG. 8B
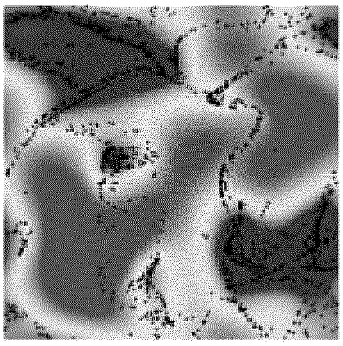
(c)
FIG. 8C
FIG. 8

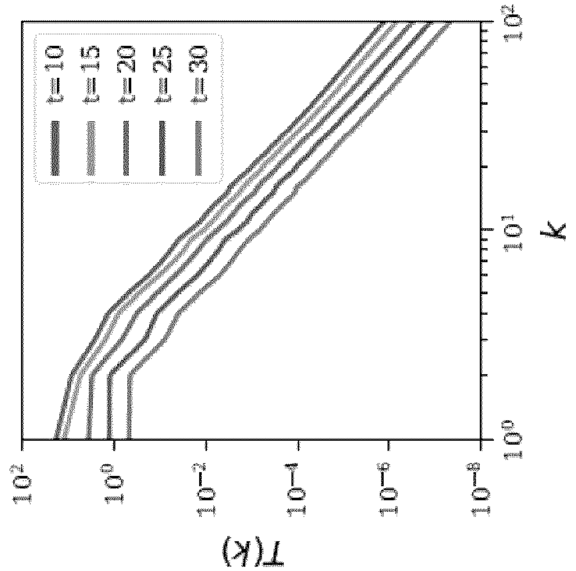
FIG. 9B
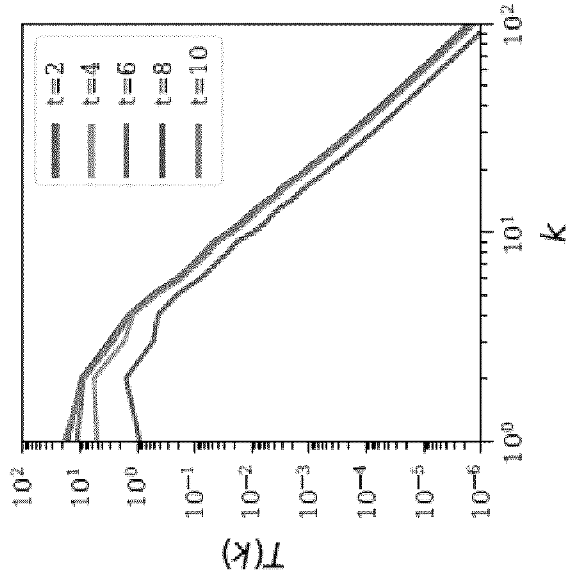
FIG. 9A
FIG. 9

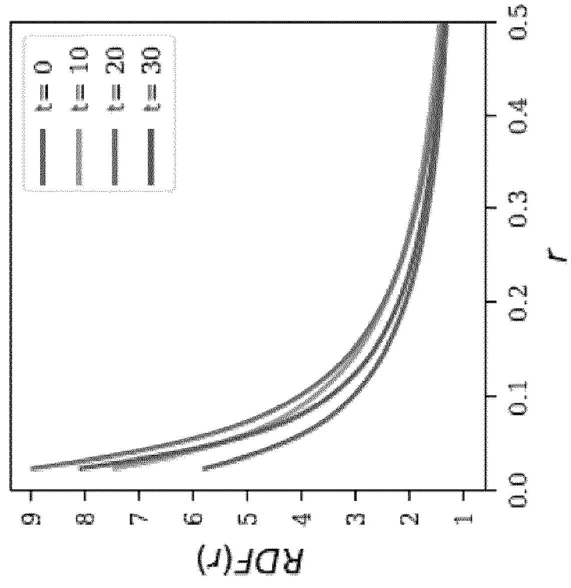
FIG. 10A
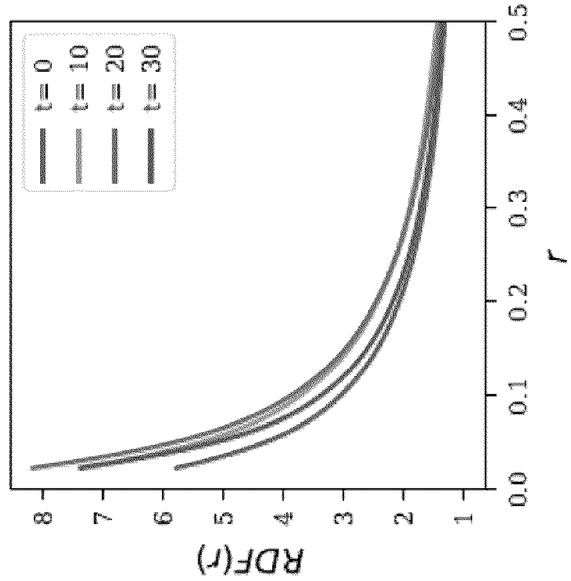
FIG. 10B
FIG. 10

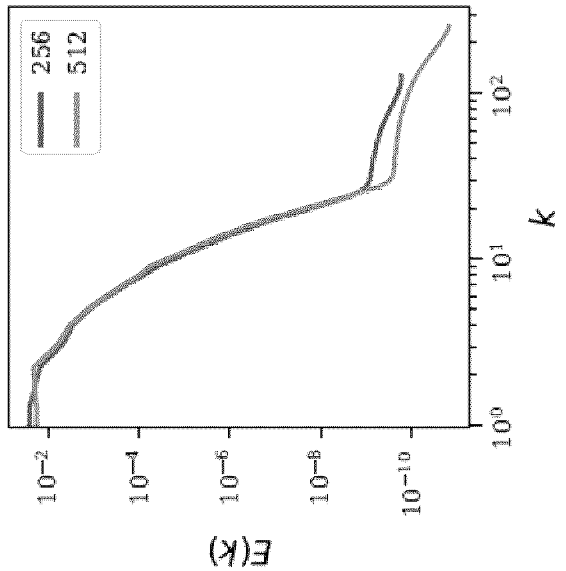
FIG. 12B
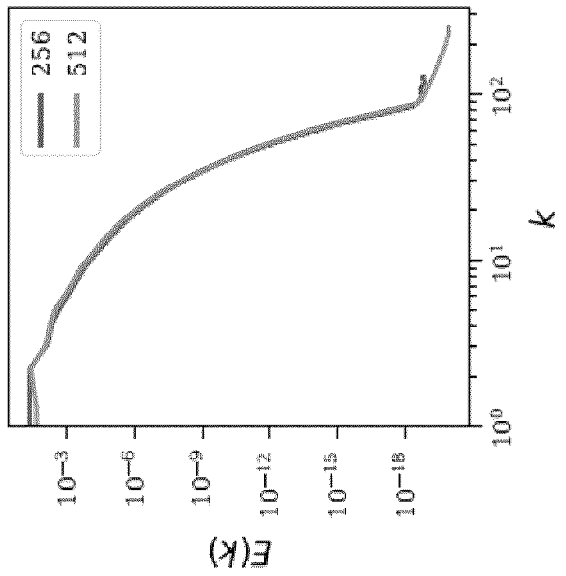
FIG. 12A
FIG. 12

SYSTEMS AND METHODS FOR HEATING OF DISPERSED METALLIC PARTICLES

TECHNICAL FIELD

The embodiments disclosed herein relate to heating of dispersed metallic particles, and, in particular to systems and methods for induction heating of dispersed metallic particles and induction heating of dispersed metallic particles in a turbulent flow.

Introduction

Particle-laden turbulent flows with heat transfer are present in several physical systems and industrial processes. Examples include soot-laden combustion, particle-based solar receivers, food processing, air pollution control, and planetesimal formation. These systems are characterized by a strong coupling between solid phase particles and turbulence of a carrier fluid. Micro- and nano-sized particles are highly desirable for such applications due to their high specific surface area which facilitate the interphase heat transfer.

As an example of their applications, particle-based solar receivers rely on the added particle suspension within a carrier fluid to increase absorption of solar radiation and, concomitantly, a transfer rate of the thermal energy from the solid particles to the turbulent carrier fluid. This can effectively heat the bulk flow with a higher thermodynamic efficiency. Particle-fluid exchanges are rendered more challenging due to a preferential clustering of the particles in regions of high shear and low vorticity. This can be especially problematic when the dispersed particles are externally heated, as the dispersed particles generate localized thermal gradients in the gas phase enhancing anisotropy within the carrier fluid and reducing the thermal gradient, thus potentially limiting heat transfer between the solid/gas phases. When reactive material is used in the dispersed phase, the preferential clustering and inhomogeneous heating can directly impact ignition and combustion processes.

Accordingly, improved systems and methods for heating of dispersed metallic particles, and in particular induction heating of dispersed metallic particles in a turbulent flow, are desired.

SUMMARY

A system for inductive heating of dispersed metallic particles is provided. The system includes: a particle-laden flow including a carrier phase comprising a carrier fluid and a dispersed phase comprising the dispersed metallic particles; an inductive heating subsystem for inductively heating the dispersed metallic particles, the inductive heating subsystem comprising a magnetic field generator for generating a magnetic field for heating the dispersed metallic particles via at least one of hysteresis and Joule heating mechanisms; and a control unit for controlling an operating parameter of the inductive heating subsystem to control a flow parameter of the particle-laden flow, the flow parameter being any one or more of an induction heating timescale, a particle thermal timescale, a heat diffusion in the carrier phase, and a particle clustering of the dispersed metallic particles.

The magnetic field generator may include an electromagnetic coil for generating an external alternating current magnetic field.

The magnetic field may be a high-frequency external alternating magnetic field.

The flow parameter may be controlled according to an induction heating model. The induction heating model may include model parameters including the induction heating timescale, an initial temperature of the dispersed metallic particles, and a Curie temperature of the dispersed metallic particles. The initial temperature and the Curie temperature may be known and the induction heating timescale may be a user-defined model parameter.

The flow parameter may be controlled according to an induction heating model represented by:

$$T_p = T_{p0} + (T_{Curie} - T_p)(1 - e^{-t/\tau_{ind}}),$$

wherein $T_{p0}$ is the particle initial temperature, TCurie is the Curie temperature, and $\tau_{ind}$ is the induction heating timescale.

The operating parameter may be an alternating current magnetic field frequency or an alternating current magnetic field magnitude.

The operating parameter may be a frequency of the magnetic field, and the control unit may adjust the frequency to decrease the induction heating timescale to produce a more homogeneous thermal distribution of the carrier fluid.

The particle-laden flow may be used as a fuel, and the system may be a component of a heating ignition system for igniting the fuel via a combustion or convection process.

The particle-laden flow may be used as a fuel, and the system may be a component of a power generation system for a vehicle or a propulsion system for a vehicle, and the vehicle may be a land-based vehicle, a water-based vehicle, an air-based vehicle, or a space-based vehicle.

The particle-laden flow may be used as a fuel, and the system may be a component of a heating ignition system for two dimensional surface heating or three dimensional volumetric heating.

The particle-laden flow may be a fuel or a component of a fuel, the fuel may be a nanothermite-based fuel or a micro-thermite-based fuel, and the system may be a component of an ignition system for igniting the nanothermite-based or micro-thermite-based fuel.

The system may be used in a power generation system.

The system may be used in a propulsion system.

The system may be used in a space debris management system.

The system may be used in a magnetohydrodynamic system for motility of magnetic particles.

The system may be used to perform two-dimensional surface heating or three-dimensional volumetric heating.

The system may be used in an energy generation system, and the dispersed metallic particles may be used as energy carriers in the energy generation system.

The dispersed metallic particles may be heated or ignited, and energy of the heating or ignition reaction may be transferred into a working fluid.

A method of inductive heating of dispersed metallic particles is provided. The method includes: providing a particle-laden flow comprising a carrier phase comprising a carrier fluid and a dispersed phase comprising the dispersed metallic particles; exposing the dispersed metallic particles to a magnetic field for heating the dispersed metallic particles via at least one of hysteresis and Joules heating mechanisms; inductively heating the dispersed metallic particles in the particle-laden flow via the magnetic field; and controlling a flow configuration of the particle-laden flow by adjusting a flow parameter, the flow parameter being any one or more of an induction heating timescale, a particle thermal timescale, a heat diffusion in the carrier phase, and a particle clustering of the dispersed metallic particles.

Adjusting the flow parameter may include adjusting the flow parameter according to an induction heating model, the induction heating model may include model parameters including the induction heating timescale, an initial temperature of the dispersed metallic particles, and a Curie temperature of the dispersed metallic particles, and the initial temperature and the Curie temperature may be known and the induction heating timescale may be a user-defined model parameter.

Adjusting the flow parameter may include adjusting the flow parameter according to an induction heating model, the induction heating timescale may be a model parameter of the induction heating model, and the induction heating timescale may be the only model parameter that is user-defined.

Adjusting the flow parameter may include adjusting the flow parameter according to an induction heating model represented by:

$$T_p = T_{p0} + (T_{Curie} - T_p)\left(1 - e^{-t/\tau_{ind}}\right),$$

wherein $T_{p0}$ is the particle initial temperature, TCurie is the Curie temperature, and $\tau_{ind}$ is the induction heating timescale.

The magnetic field may be an external alternating magnetic field.

Adjusting the flow parameter may include decreasing the induction heating timescale and the particle thermal timescale to produce a more homogeneous thermal distribution of the carrier fluid.

Decreasing the induction heating timescale may be imparted by a frequency of the magnetic field.

The method may further include varying the inductive heating of the dispersed metallic particles by adjusting a parameter of the magnetic field, the parameter being an alternating current magnetic field frequency, an alternating current magnetic field magnitude, a magnetic coil size, or a magnetic coil geometry.

Adjusting the flow parameter may include increasing the particle thermal timescale for the dispersed phase to impede heat transfer from the dispersed phase to the carrier phase.

Adjusting the flow parameter may include decreasing the particle thermal timescale to increase a heat transfer rate for rapidly transferring heat from the dispersed phase to the carrier phase to produce a more homogeneous fluid temperature distribution.

Adjusting the flow parameter may include decreasing the particle thermal response time to increase heat transfer from the dispersed phase to the carrier phase to make the particle-laden flow more thermally homogeneous.

Adjusting the flow parameter may include increasing the particle thermal timescale to reduce heat transfer to the carrier phase.

Adjusting the flow parameter may include increasing the particle thermal response time to reduce an amount of heat transferred from the dispersed metallic particles to the carrier fluid.

The method may further include using the particle-laden flow as a fuel, selecting the dispersed metallic particles based on the dispersed metallic particles having a Curie temperature above a reaction ignition point of the particle-laden flow, and where inductively heating the dispersed metallic particles includes inductively heating and igniting the dispersed metallic particles in a turbulent flow field.

Controlling the flow configuration may include controlling carrier fluid and dispersed metallic particle characteristics at an ignition point of the particle-laden flow for an efficient combustion.

Adjusting the flow parameter may include reducing inhomogeneities in either the dispersed phase or the carrier phase to improve combustion behaviour of the particle-laden flow.

The method may further include using the particle-laden flow as a fuel, and controlling the flow configuration may include optimizing the flow configuration at an ignition point of the fuel to obtain a homogeneous heat release and distribution.

Adjusting the flow parameter may include decreasing the induction heating timescale to decrease the particle clustering and increase a heating rate. Systems and methods described herein relate to preferential clustering of inductively-heated solid particles dispersed within an isotropic, compressible turbulent carrier gas. Such clustering has been investigated via Direct Numerical Simulations (DNS). Described herein is a semi-empirical model for solid particle heating through hysteresis and Joules induction mechanisms as these dispersed particles evolve in a high-frequency external alternating magnetic field. In this model, the induction heating of ferrous or ferrimagnetic particles is limited by the Curie temperature of the material. The present disclosure shows that the turbulence-driven particle clustering is affected by the local change in the temperature-dependent viscosity of the gas. Furthermore, the local clustering can inhibit the heat transfer to the gas by creating local hot-spots. The present disclosure parametrically evaluates the relative timescales between the induction heating and the solid-gas thermal exchanges. A decrease of the induction heating and particle thermal characteristic timescales, where the former can be imparted by the frequency of the external electromagnetic source, results in a more homogeneous thermal distribution of the carrier gas.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 3A is a graph illustrating turbulent kinetic energy decay with various induction heating and particle thermal timescales for temperature-dependent viscosity;

FIG. 3B is a graph illustrating turbulent kinetic energy decay with various induction heating and particle thermal timescales for constant viscosity;

FIG. 5A is a graph illustrating evolution of the energy spectrum of thermal kinetic energy for I1T0 with no particle heating;

FIG. 5B is a graph illustrating evolution of the energy spectrum of thermal kinetic energy for I1T10 with particle heating;

FIG. 6A is a graph illustrating an energy spectrum of thermal kinetic energy for all cases at t=30 s for temperature-dependent viscosity;

FIG. 6B is a graph illustrating an energy spectrum of thermal kinetic energy for all cases at t=30 s for constant viscosity;

FIG. 7A is a graph illustrating time evolution of the root-mean-square gas temperature for different induction heating and thermal timescales;

FIG. 7B is a graph illustrating time evolution of the root-mean-square particle temperature for different induction heating and thermal timescales;

FIG. 8A is a snapshot of gas temperature and particle distribution in a two dimensional sliced of the domain for an I1T10 case;

FIG. 8B is a snapshot of gas temperature and particle distribution in a two dimensional sliced of the domain for an I1T100 case;

FIG. 8C is a snapshot of gas temperature and particle distribution in a two dimensional sliced of the domain for an I1T1000 case;

FIG. 9A is a graph illustrating time evolution of temperature spectrum of case I1T1000;

FIG. 9B is a graph illustrating time evolution of temperature spectrum of case I1T1000;

FIG. 10A is a graph illustrating RDF time evolution of an I∞T0 case;

FIG. 10B is a graph illustrating RDF time evolution of an I1T10 case;

FIG. 12A is a graph illustrating an energy spectrum E(k) of TKE for I1T10 using $256^3$ and $512^3$ grids at different times corresponding to the same TKE in the statistical steady state regime with no induction;

FIG. 12B is a graph illustrating an energy spectrum E(k) of TKE for I1T10 using $256^3$ and $512^3$ grids at different times corresponding to the same TKE in the decaying regime with induction;

DETAILED DESCRIPTION

Figure 1:
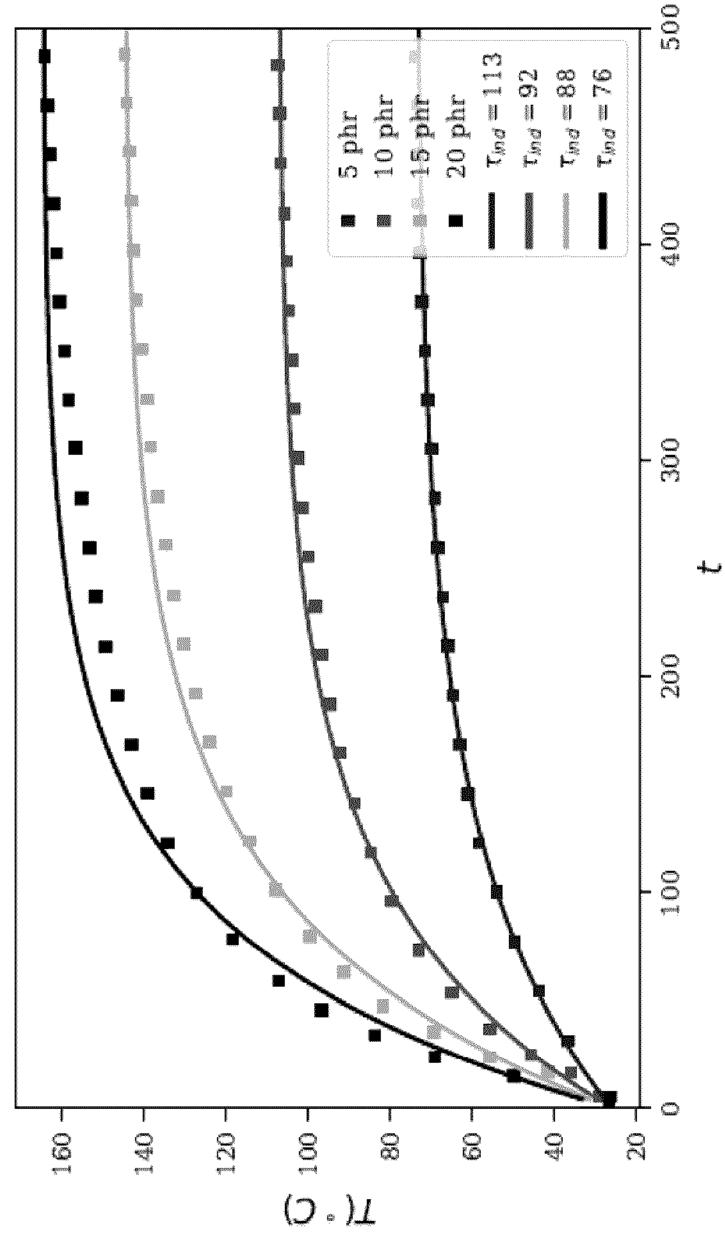
FIG. 1 is a graph illustrating a comparison between experimental data with a proposed induction heating model of the present disclosure.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The following relates generally to heating of dispersed metallic particles, and more particularly to systems and methods for induction heating of dispersed metallic particles and systems and methods for induction heating of dispersed metallic particles in a turbulent flow. The particles may be nano-particles (nanoscale size) or micro-particles (microscale size).

Systems and methods described herein relate to preferential clustering of inductively-heated solid particles dispersed within an isotropic, compressible turbulent carrier gas. Such clustering has been investigated herein via Direct Numerical Simulations (DNS). Described herein is a semi-empirical model for solid particle heating through hysteresis and Joules induction mechanisms as the dispersed particles evolve in a high-frequency external alternating magnetic field. In the model, the induction heating of ferrous or ferrimagnetic particles is limited by the Curie temperature of the material. The present disclosure shows that the turbulence-driven particle clustering is affected by the local change in the temperature-dependent viscosity of the gas. Furthermore, the local clustering can inhibit the heat transfer to the gas by creating local hot-spots. The present disclosure parametrically evaluates the relative timescales between the induction heating and the solid-gas thermal exchanges. A decrease of the induction heating and particle thermal characteristic timescales, where the former can be imparted by the frequency of the external electromagnetic source, results in a more homogeneous thermal distribution of the carrier gas.

Particle-laden turbulent flows with heat transfer are present in several physical systems and industrial processes. Examples include soot-laden combustion, particle-based solar receivers, food processing, air pollution control, and planetesimal formation. These systems are characterized by a strong coupling between solid phase particles and turbulence of a carrier fluid. Micro- and nano-sized particles are highly desirable for such applications due to their high specific surface area which facilitate the interphase heat transfer.

As an example of their applications, particle-based solar receivers rely on the added particle suspension within a carrier fluid to increase absorption of solar radiation and, concomitantly, a transfer rate of the thermal energy from the solid particles to the turbulent carrier fluid. This can effectively heat the bulk flow with a higher thermodynamic efficiency. Particle-fluid exchanges are rendered more challenging due to a preferential clustering of the particles in regions of high shear and low vorticity. This can be especially problematic when the dispersed particles are externally heated, as the dispersed particles generate localized thermal gradients in the gas phase enhancing anisotropy within the carrier fluid and reducing the thermal gradient, thus potentially limiting heat transfer between the solid/gas phases. When reactive material is used in the dispersed phase, the preferential clustering and inhomogeneous heating can directly impact ignition and combustion processes.

Using dispersed metallic particles in a turbulent flow field, the heating can also be accomplished through an external alternating electromagnetic field. By inductively heating the dispersed metallic particles, a time-dependent temperature rise results in a time-varying heat transfer to the carrier fluid. Induction heating of metallic particles is used in several medical and industrial applications, such as hyperthermia, where nanoparticles are used in cancer therapy procedures, and particle-embedded thermoplastic polyurethane adhesives (TPU), where Fe micro particles are used in high temperature adhesive films.

Induction heating occurs due to two mechanisms: hysteresis and Joules heating. Both processes depend on particle and electromagnetic field properties. However, the heating process has a well-defined critical point where particles reach a limit temperature called the Curie temperature. The Curie temperature represents a characteristic temperature defining a transition point of the magnetic properties of a metallic solid. Above the Curie temperature the solid loses its magnetic potential by becoming paramagnetic, and heating is impeded. The characteristic transition point has been used for controlled heating applications. Depending on the material, the Curie temperature can occur at a low or high temperature. For hyperthermia applications, a sufficient temperature rise of 14-22° C. from 27° C. in a physiologically tolerable range of particle concentration and magnetic field can be achieved by using $MgFe_2O_4$ ferrite nanoparticles. In steam reforming reactors, Nickel-Cobalt ferromagnetic nanoparticles have been used as a catalyst in a chemical reaction which occurs at a temperature equal to the corresponding Curie temperature of 800° C.

By correctly selecting metallic particles (e.g. ferro/ferrimagnetic solid particles) with a Curie temperature above the reaction ignition point of the solid/gas mixture, a system can be devised to inductively heat and ignite fuel particles in a turbulent flow field. The present disclosure provides a numerical model for induction heating of metallic particles—via hysteresis and Joules heating—in a turbulent flow field and explores the characteristics of the system prior to ignition. The turbulent flow field represents an important property for controlling heat transfer between the particles and the flow, and impacts an ignition time of the system.

Particle preferential concentration phenomena affects spatial distribution of the particles leading to localized particle groupings. Particle groupings or clustering impact heat transfer statistics causing non-negligible temperature fluctuations in the flow. This is primarily characterized by the bulk Stokes number of the flow. By considering an instantaneous Stokes number based on the Kolmogorov scale, particles can generate ($St_\eta<1$) or destroy ($St_\eta>1$) turbulent kinetic energy of the carrier fluid. These regimes are particularly important for decaying isotropic turbulence with time-varying heated particle-laden flows.

Described herein are the governing equations and details of the numerical methods of the fluid and particulate phases and as well as the physics behind the proposed induction heating model and the fluid-particle momentum and thermal coupling. The turbulent field properties and simulation setup and parameters are also described. An investigation of the effect of time-varying induction heating of particles in decaying isotropic turbulence is also provided. The present disclosure highlights the effect of the transient particle heating on the turbulent flow kinetic and thermal properties and scales, as well as the effect of fluid turbulence on the particles' thermal and spatial distributions.

Numerical considerations will now be described.

To study the effects of induction heating of metallic dispersed particles in a turbulent carrier gas, direct numerical simulations (DNS) in a Lagrangian-Eulerian framework were conducted. The gas phase flow field is described by Eulerian formalism while the particle transport is described by Lagrangian point-particle tracking. In this approach, the monodispersed spherical particles are considered to be smaller than both the grid size and the Kolmogorov length scales, but bigger than the mean free path of the typical fluid molecules, so the Eulerian assumptions still stand true. For all cases, one-way coupling was used between the solid and gas phases in momentum transfer and two-way coupling was used for the energy transfer, while neglect particle-particle interactions were neglected. To capture the effects of transient heating over both phases, one-way coupling is used to avoid having two-way coupling effects at high wavenumber.

This approach uses the Pencil-code, which is an open-source, high-order compact finite difference code for compressible hydrodynamics flows. The code has been extended to include particle induction heating due to hysteresis and Joules heating, as well as a fluid variable viscosity using a temperature power law. The Pencil-code is parallelized using Message-Passing Interface (MPI). A sixth-order compact finite difference scheme is used for spatial derivatives and a low-storage, third-order Runge-Kutta scheme is applied for time integration of the fluidic components. To update particle trajectories in the Lagrangian framework, a tri-linear Lagrangian interpolation scheme is used.

The governing equations and modelling assumptions for the carrier gas, dispersed phase, and the induction heating model of the particles will now be described.

Governing equations and modelling assumptions for the carrier gas will now be described.

The governing equations for the conservation of mass, momentum and energy read:

$$\frac{\partial \rho}{\partial t} + \frac{\partial \rho u_i}{\partial x_i} = 0 \tag{1a}$$

$$\frac{\partial \rho u_i}{\partial t} + \frac{\partial \rho u_i u_j}{\partial x_i} = -\frac{\partial p}{\partial x_i} + \frac{\partial}{\partial x_j}\left(\mu_g\left(\frac{\partial u_i}{\partial x_j} + \frac{\partial u_j}{\partial x_i} - \frac{2}{3}\frac{\partial u_k}{\partial x_k}\delta_{ij}\right)\right) + f_i \tag{1b}$$

$$\frac{\partial(\rho C_{v.g} T_g)}{\partial t} + \frac{\partial(\rho C_{p.g} T_g u_j)}{\partial x_i} = \frac{\partial}{\partial x_j}\left(\kappa_g \frac{\partial T_g}{\partial x_j}\right) + Q_{pg} \tag{1c}$$

where ρ, p, $T_g$ and $u_i$ are respectively the fluid density, pressure, temperature (subscript g denotes the gas phase) and velocity in the i-th direction.

$K_g$, $C_{v,g}$ and $C_{p,g}$ are the gas thermal conductivity, and specific heat at constant volume and pressure.

A forcing function, $f_i$, is imposed to sustain the turbulent flow before the induction heating is applied. The turbulence forcing term is described in more detail below.

The term $Q_{pg}$ accounts for the exchanges between solid particles (subscript p) and gaseous phase (subscript g) and represents the heat transfer between the two phases (and described below).

The governing equations are closed with the ideal gas law. The viscosity of the gas is temperature dependent and follows Sutherland power law $\mu=\mu_0(T/T_{ref})^{2/3}$ where $\mu_0$ and $T_{ref}$ represent the reference viscosity and temperature of the carrier phase. A comparative set of simulations were also conducted at constant viscosity for comparison.

Governing equations and modelling assumptions for the dispersed phase will now be described.

A Lagrangian approach includes tracking each solid particle and computing its velocity following Newton's second law. Particles are assumed to be mass points. Considering the high density of the particles relative to the carrier gas, $\rho_p/\rho_g>100$, all forces acting on the particles are neglected (lift force, virtual mass force, Basset force and pressure gradient force) except for the fluid-particle drag force, which is assumed to be the main particle driving force. The equations of particle motion read $$\frac{dx_{p,i}}{dt} = u_{p,i} \tag{2}$$

$$\frac{du_{p,i}}{dt} = \frac{C_D}{\tau_p}[\tilde{u}_{g,i}(x_{p,i}) - u_{p,i}] \tag{3}$$

$$C_D = 1 + 0.15\mathrm{Re}_p^{0.687}$$

where $C_D$ is the single particle drag coefficient, $u_{g,i}(x_{p,i})$ the gas velocity at the particle location $x_{p,i}$, and $u_{p,i}$ the particle velocity.

$C_D$ is calculated following Schiller-Naumann correlation $$C_D = \frac{24}{Rc_p}\left(1 + 0.15\mathrm{Re}_p^{0.687}\right)$$

which is a function of the particle-based Reynolds number is defined $Re_p=d_p|u_i-u_{p,i}|/v_g$, where $d_p$ represents the particle diameter and $v_g$ the gas kinematic viscosity.

The term $\tau_p$ represents the particle inertial relaxation time and is given by $$T_p = d_p^2\rho_p/18\mu_g,$$

where the subscripts p and g denote the particle and gas respectively.

It is worth mentioning that the particles are neutrally charged and the magnetic field lines are considered parallel, thus no linear forces due to the Lorentz force or the magnetic field gradient are considered. The particle energy balance equation can be written as a temporal evolution of the particle temperatures:

$$m_pC_{p,p}\frac{dT_p}{dt} = Q_{ind} - Q_{pg} \tag{4}$$

where $m_p$ represents the particle mass and $C_p$, p represents the specific heat of the particle.

The first term on the right hand side of equation (4), $Q_{ind}$, represents the heat contribution from induction heating. The heat contribution from induction heating is described further below.

The second term, $Q_{pg}$ represents the heat transferred from the particle to the gaseous phase. This term also appears as a source term in the gas phase equations. The particles are assumed to be thermally thin, meaning the temperature is uniformly distributed throughout the particles. $Q_{pg}$, can be expressed as:

$$\frac{Q_{pg}}{m_pC_{p,p}} = \frac{Nu_p}{2\tau_{th}}(T_p - T_g) \tag{5}$$

where $Nu_p$ represents the particle based Nusselt number and is given by the Ranz-Marshall correlation:

$$Nu_p = h_pd_p/K_g = 2 + 0.6Re_p^{0.5}Pr^{0.3} \tag{6}$$

where Pr represents the Prandtl number $Pr=\mu c_p/\kappa_g$. The Ranz-Marshall correlation covers a wide range of particle Reynolds number up to $5\times10^4$ which is suitable for the current analysis.

The thermal response time, $\tau_{th}$, representing the characteristic time scale for the heat transfer, is given by $$T_{th} = \rho_pC_{p,p}d_p^2/12K_g.$$

Governing equations and modelling assumptions for the induction heating model of the particles will now be described.

Ferromagnetic and ferrimagnetic metallic particles exposed to an alternating magnetic field heat primarily due to hysteresis and Joules heating. The hysteresis is caused by the continuous rotation of the particle's magnetization of each single magnetic domain when placed in an alternating current (AC) magnetic field. The Joule heating is due to generated eddy currents owing to the electrical conductivity of the material.

Eddy currents occur if an electrically conductive material, exposed to an AC magnetic field, has a characteristic length scale larger than the skin depth. The skin depth depends on the frequency of the AC field ($\omega$), the electrical conductivity ($\sigma$), and the relative magnetic permeability ($\mu_r$) of the metallic particle following $\delta=\sqrt{2/\omega\sigma\mu_r}$. A small skin depth can be obtained by a high material electrical conductivity and magnetic permeability and a high AC frequency. For example, a nickel particle in a 5 MHz magnetic field has a skin depth of 6.2 microns. For smaller ferrite or ferromagnetic particles, the temperature rise due to induction can only be achieved through hysteresis heating although the heating potential is finite.

Inductive heating can raise the particle temperature until the Curie temperature is reached, at which point the metallic particle becomes paramagnetic and no heat can be generated through induction. The paramagnetic state not only impedes the hysteresis mechanism, but also the Joules heating effects. As the material temperature increases up to the Curie temperature, the material's relative permeability decreases leading to an increase in the skin depth following the equation $\delta=\sqrt{2/\omega\sigma\mu_r}$. In the case of ferro/ferrimagnetic micro/nanoparticles, the usual skin depth at the Curie temperature is substantially larger than the size of the particles, hindering the Joules heating contribution.

Both mechanisms (hysteresis and Joule heating) are quite complex to be accurately described by simple equations. They can, however, be determined empirically for specific applications under well-known conditions. The amount of heat generated depends on several particle parameters: size, shape, geometry, magnetic permeability, electrical conductivity, size and shape of the hysteresis loop, proximity to coil and volume fraction. The amount of heat generated also depends on the parameters of the electromagnetic field. The electromagnetic field parameters may include: AC magnetic field frequency and magnitude, coil size and geometry The heating behavior of ferro/ferri-magnetic particles has been reported by several experimental studies. In the light of these studies, the following model for the particle temperature trend due to induction is proposed:

$$T_p = T_{p0} + (T_{Curie} - T_p)\left(1 - e^{-t/\tau_{ind}}\right) \quad (7)$$

as the model represents the functional form of the solution to Newton's law of heating. In the equation, $T_{p0}$ is the particle initial temperature, TCurie is the Curie temperature or the maximum temperature that can be reached, and $\tau_{ind}$ is the induction heating characteristic timescale.

One advantage of this model is that all the unknowns are lumped into one: the induction heating timescale $\tau_{ind}$. Consequently, the induction heating term in the particle energy conservation equation Eq. (4) can be expressed as:

$$\frac{Q_{ind}}{m_p C_{p,p}} = \frac{(T_{Curie} - T_p)}{\tau_{ind}} \quad (8)$$

The proposed model can be used to account for the heating behavior of micro and nanoparticles due to hysteresis only or the combined effects of hysteresis and Joules heating, as long as the timescale of the heating processes is correctly estimated. For a given particle, with a known initial and Curie temperature, the only user-defined model parameter is the characteristic induction heating timescale, $\tau_{ind}$.

This empirical model has been assessed against experimental data from a prior study. In the prior experimental work, the heating behavior of inductively-heated ferromagnetic Fe particles loaded in thermoplastic adhesive films was investigated under different conditions such as particle size/concentration, film thickness, and output power of the induction heater. The present disclosure considers the cases in which 43 μm Fe particles are studied.

A comparison between the experimental data from prior work and a proposed induction heating model of the present disclosure, according to an embodiment, is shown in FIG. 1. Symbols represent the experimental data, while full lines are the modeled data where phr is the parts per hundred of rubber. Different colours represent different volume fractions of Fe particles. The measured temperature evolution for concentrations of 5, 10, 15 and 20 phr (parts per hundred parts of rubber) is plotted in FIG. 1. An initial temperature of 26 degrees is assumed and the maximum temperature, or Curie temperature, is selected based on the prior experimental work. The characteristic timescale of induction heating at the various concentrations is computed as best fit parameter. Based on the experimental results, these are: $\tau_{ind}$=113, 92, 88, and 76, respectively for the 5, 10, 15 and 20 phr cases.

Despite the empirical nature of the model for inductive heating, FIG. 1 shows a good agreement with the experimental data. Other studies reported a similar exponential trend but are not discussed here for the sake of brevity.

A simulation framework of the present disclosure will now be described.

Simulations of dispersed metallic spherical particles in isotropic turbulence were performed in a cubic domain of length $2\pi$ with a baseline resolution of $256^3$ for a $Re_\lambda \approx 64$.

Periodic boundary conditions are applied in all three directions for all variables in both the carrier and particulate phases. The chosen resolution results in a grid cell size of 0.0245, which is much larger than the particle diameters used in all simulations in order to satisfy the point-particle assumption.

The particles (number of particles is $N_p$=500,000) are initialized at random positions in the domain with zero initial velocity. Their density is 1500 times the fluid density and their radius is equal to $r_p$=0.005.

For the fluid phase, each simulation is initialized with a random velocity field distribution. A solenoidal forcing function is applied to obtain an isotropic stationary turbulent field with dispersed particles. Forcing is applied at a low wavenumber, $k_f$. A $k_f$ as 1.5 times the lowest wavenumber was chosen. The forcing wavevectors are randomly chosen from a shell in Fourier space of radius $k_f$ and range $k_f \pm 0.5$. The forcing intensity is selected to correspond to the desired turbulent gas Reynolds number defined as $Re_{urms}=u_{rms}L_f/\nu$. The main fluid properties of the homogeneous isotropic turbulence are summarized in Table 2:

TABLE 2

Characteristics of the turbulent flow field in the statistically steady-state regime.

| Parameter | Symbol | Value |
|---|---|---|
| Turbulent Reynolds number | $Re_{urms}$ | 257 |
| Turbulent velocity fluctuations | $u_{rms}$ | 0.38 |
| Reynolds based on Taylor scale | $Re_\lambda$ | 64.4 |
| Fluid turbulent kinetic energy | $q^2$ | 0.075 |
| Dissipation rate | $\epsilon$ | 0.005 |
| Integral length scale | $L_f$ | 4.18 |
| Integral time scale | $T_L$ | 10.92 |
| Kolmogorov length scale | $\eta_K$ | 0.082 |
| Kolmogorov timescale | $T_K$ | 1.1 |

The condition of the resolution of the smallest scales $k_{max}\eta$=3.7>1.5 is satisfied. The simulations with forcing are conducted with dispersed particles but without any induction heating. Once the domain average $u_{rms}$ stabilizes, a statistical stationary-state regime is reached and the forced-turbulence simulations are continued for five eddy turnover times. At which time, the cases represent a well-characterized isotropic turbulent flow field with dispersed particles. Once this fully developed state is reached, the forcing function is removed and the induction heating model is switched on following the parameters in Table 1; that corresponds to our time t=0:

TABLE 1

Simulation cases with different ratios of induction heating timescale normalized by eddy integral timescale, $T_{ind}/T_L$, and particle thermal timescale normalized by induction heating timescale, $T_L/T_{ind}$. For the case name, the capital "I" and "T" represent the induction and thermal timescale, respectively, followed by the value of the normalized timescale.

| Case | $T_{ind}/T_L$ | $T_{th}/T_{ind}$ |
|---|---|---|
| I∞T0 | ∞ | 0 |
| I10T10 | 10 | 10 |
| I1T10 | 1 | 10 |
| I01T10 | 0.1 | 10 |
| I1T100 | 1 | 100 |
| I1T1000 | 1 | 1000 |

Note that, for all simulation cases (or "cases"), an identical flow field and particle distribution is used at the start of the induction heating, which allows for a better characterization of the heating timescale on the particle dispersion.

Results of the experimental work of the present disclosure will now be described.

Figure 2:
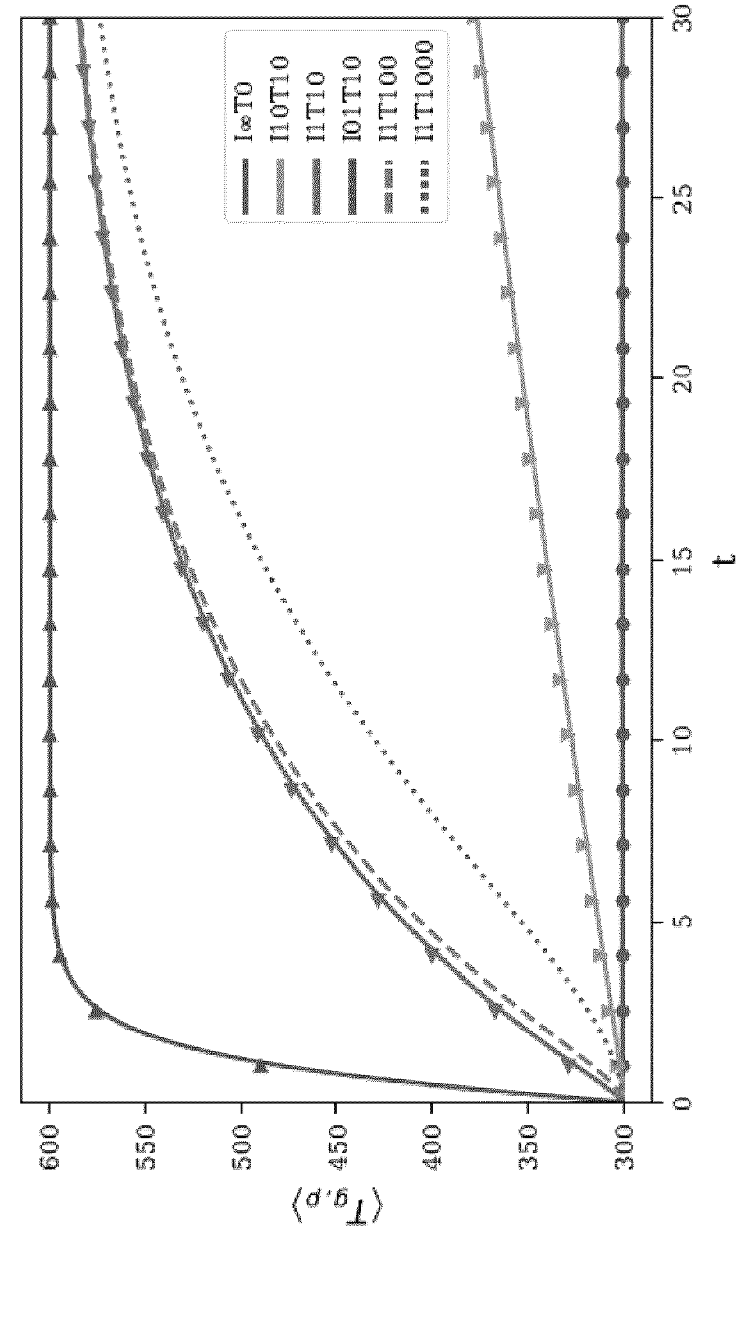
FIG. 2 is a graph illustrating average gas and particle temperature as a function of time for all cases (I∞T0, I10T10, I1T10, I01T10, I1T100, I1T1000)

As the induction heating is activated, the fluid particles heat up. The bulk fluid temperature also increases as heat is transferred from the inductively-heated particles to the fluid. The evolution of the average gas and particle temperature are plotted in FIG. 2. FIG. 2 illustrates average gas and particle temperature as a function of time for all cases. Full and dashed lines are used for the gas phase. Symbols are used for the solid phase for cases I∞T0 (○), I10T10 (∇), I1T10-I1T100-I1T100 (◁ ), I01T10 (▷ ).

As can be seen in FIG. 2, decreasing the induction timescale leads to a more rapid rise up to the Curie temperature. Furthermore, increasing the particle thermal timescale leads to a delay in the rise of the gas temperature. However, the particle thermal response time does not significantly affect the mean temperature of the particles, as shown for cases I1T10, I1T100 and I1T1000.

The time-dependent induction heating of the particle results in a local heating of the gas surrounding the solid phase. The increased temperature results in thermodynamic and thermophysical changes of the gas, more specifically a decrease in the local density and an increase of the local viscosity. These directly affect the local turbulence characteristics in the flow.

FIG. 3A shows the temporal decay of the turbulent kinetic energy (TKE) normalized by its initial value, for various induction heating and thermal timescales. Not surprisingly, lower induction heating and thermal timescales result in a faster decay of the homogeneous isotropic turbulence. This faster decay is primarily a consequence of the increased viscosity of the carrier gas with increased temperature.

To highlight the role of variable viscosity to the turbulent decay, the simulations were run assuming a constant viscosity of the carrier gas (shown in FIG. 3B). Interestingly, the decay of the TKE remains, for the most part, unaffected by the timescale of the induction heating as shown in FIG. 3B. In other words, the compressibility effect in the gas has a minor role in the turbulence decay rate.

Figure 4:
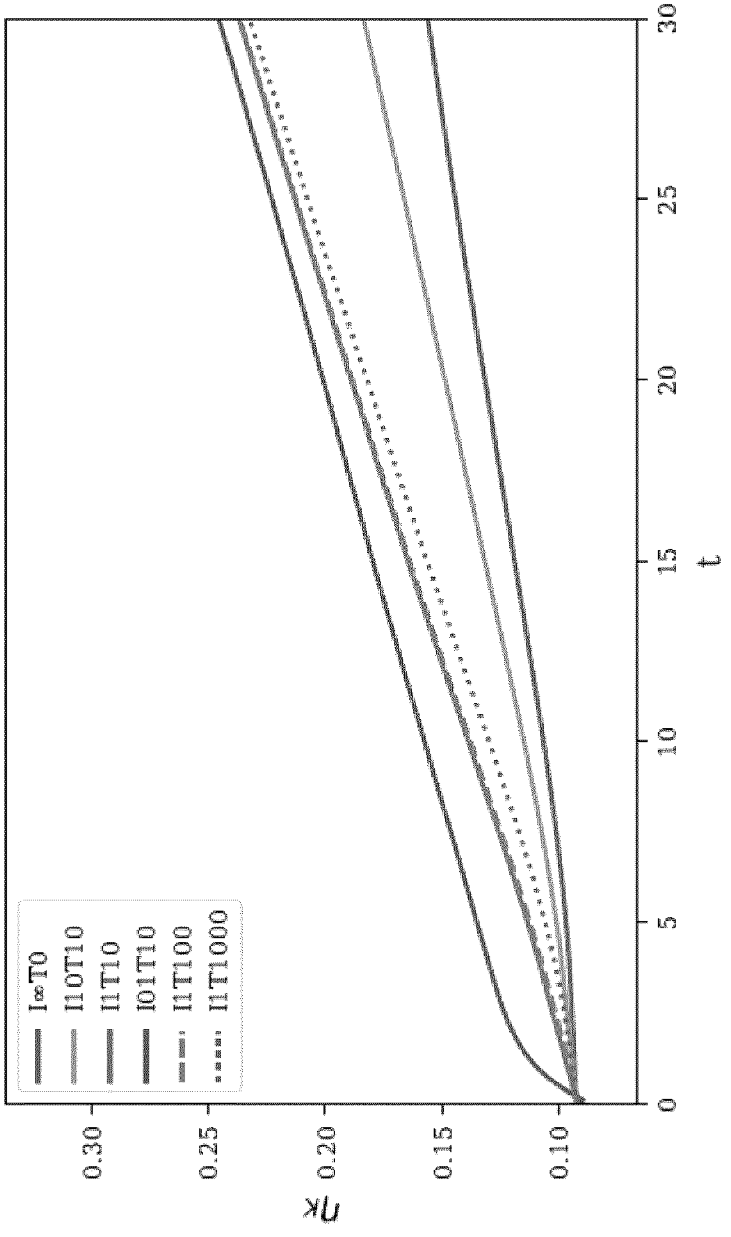
FIG. 4 is a graph illustrating evolution of the Kolmogorov length scale to localized particle heating.

The impact of the carrier gas heating can also be observed from the evolution of the Kolmogorov length scale, as presented in FIG. 4. In particular, FIG. 4 illustrates evolution of the Kolmogorov length scale with to the localized particle heating.

A faster growth of Kolmogorov length-scales (relative to the fixed integral scale of the initial turbulence) corresponds to a faster decay of the turbulence, since the increase in viscosity leads to an increase in the dissipation rate, as expected.

One notable phenomena occurs with very rapid particle heating in case I01T10 (this case corresponds to the smallest induction timescale $\tau_{ind}/\tau_L=0.1$). During the initial induction heating, a small but non negligible spike in the TKE can be observed. Aggressive heating leads to a strong pressure-dilatation effect, which in turn, introduces energy back to the flow in the form of velocity fluctuations leading to an increase in the overall turbulent kinetic energy. A similar phenomena has been noted and discussed in other work. This rapid increase in TKE occurs for both the constant and temperature varying thermophysical properties.

The attenuation of the turbulent kinetic energy in decaying isotropic turbulence with dispersed particles (without any heating) occurs across all wavenumbers.

FIG. 5A shows a time evolution of the energy spectrum in the decaying regime for I∞T0 with no particle heating. The turbulent kinetic energy is reduced through fluid viscous dissipation. This behavior is explained in detail in other work. With time-evolving induction heating this turbulent decay mechanism is enhanced due to the local increase in viscosity. Naturally, this results in changes to the decay of the energy spectrum.

FIG. 5B represents a time evolution of the energy spectrum for I1T10 with particle heating. The fluid turbulent kinetic energy decreases at all low wavenumbers monotonically with time.

On the other hand, turbulent kinetic energy accumulation occurs at high wavenumbers. The heat transferred from the particles to the fluid is accumulated in the form of kinetic energy at small turbulent scales. Furthermore, the energy accumulation extends to lower wavenumbers over time. This can be seen by the extension of the plateau to lower values of k. A similar mechanism was captured by other work.

In addition, it is worth noting that an overall energy decrease at high wavenumbers occurs when heating is switched on. That can be deduced by comparing the curve t=0 to the curves t=10, 20 and 30 as the energy accumulation absolute value decreases with time. These results look similar to those in other work, where their heating term was set to a constant value. However, in the present analysis, heating is time-dependent, as it is typical for most induction-heating applications, changes in the energy spectrum and both phase temperature fluctuations are different to those of the constant heating cases as will now be described.

FIGS. 6A and 6B show an energy spectrum of all cases at time t=30 for both the temperature-dependent (FIG. 6A) and constant viscosity simulations (FIG. 6B).

The integration of the turbulent energy spectrum across the wavenumber space corresponds to the turbulent kinetic energy, therefore the variable viscosity results in a decrease of energy—primarily at the intermediate wavenumbers. Interestingly, the energy accumulation plateau remains unaffected by the change in viscosity. This is unexpected given the effect of the variable properties on the Kolmogorov length scale.

By decreasing the induction time scale $\tau_{ind}/\tau_L=\infty$, 10, 1 and 0.1 for cases I∞T0, I10T10, I1T10 and I01T10, respectively, the energy content at large wavenumbers decreases. As time advances, the mean temperature approaches the Curie temperature. Once the Curie temperature is reached, a thermal equilibrium is established leading to lower velocity fluctuations in the gas field for the small turbulent structures at high wavenumbers. This is clearly shown for case I01T10, where the Curie temperature is reached much faster compared to the other cases as seen in FIG. 2 (case I01T10 is similar to the cases studied in other work where constant heating is applied). As the Curie temperature is reached very rapidly, the energy spectrum of the isotropic turbulence is still fully developed and, consequently, the energy accumulation occurs at very lower values of E(k). This also results in a much lower TKE value as seen in FIG. 3.

The time evolution of the root mean square of the gas and particle temperatures for different induction heating and thermal timescales are shown in FIGS. 7A and 7B, respectively.

The $T_{rms}$ start from zero which corresponds to initial, quasi-isothermal condition. At time t=0 when the induction heating is first activated, the $T_{rms}$ increases indicating a transient change in temperature for both phases, then it decreases to zero again when the Curie temperature is reached and a uniform heating distribution is obtained.

By decreasing the induction timescale $\tau_{ind}=\infty$, 10, 1 and 0.1, the peak of the $T_{rms}$ increases for all cases as shown by the curves of cases I∞T0, II0T10, I1T10 and I01T10.

Moreover, increasing the thermal timescale $\tau_{th}/\tau_{ind}=10$, 100 and 1000 lead to a decrease in the $T_{rms}$ peak for the particles phase, and, surprisingly, to an increase for its corresponding values for the gas phase as shown by the curves I1T10, I1T100 and I1T1000.

For the particulate phase, an increase in the thermal timescale $\tau_{th}/\tau_{ind}=10$, 100 and 1000 impedes the heat transfer from the particle to the gas phase. In other words, the heat generation term $Q_{ind}$, in Eq. 4, becomes dominant compared to the heat transfer term $Q_{pg}$. Since induction heating is dependent on external parameters, as seen in Eq. 8, the term $Q_{ind}$ is nearly identical for all particles, leading to an homogeneous particle temperature distribution, and thus a lower particle $T_{rms,\ p}$.

On the other hand, for low thermal timescales, corresponding to high heat transfer rates ($Q_{pg}$), the heat is rapidly transferred to the fluid phase. This leads to a more homogeneous fluid temperature distribution, and thus a lower $T_{rms,\ g}$.

By increasing the thermal timescale, heat transfer to the gas is reduced, which results in a higher $T_{rms,\ g}$. It is worth mentioning that the thermal conductivity is constant in all cases.

A visual illustration of the effects of the particle thermal response time and particle temperature distribution is shown in FIGS. 8A, 8B, and 8C for cases I1T10, I1T100 and I1T1000, respectively, where $\tau_{th}/\tau_{ind}=10$, 100 and 1000. FIGS. 8A-8C illustrate snapshots of gas temperature and particle distribution in a 2D slice of the domain for cases I1T10 (FIG. 8A), I1T100 (FIG. 8B), I1T1000 (FIG. 8C) at the time t=I0 s. Blue/red colors represent cold/hot relative gas temperature fluctuations $(T_g-\langle T_g\rangle)/\langle T_g\rangle$.

The snapshots were taken at time t=10. The relative gas temperature fluctuation is considered $(T_g(t)-\langle T_g(t)\rangle)/\langle T_g(t)\rangle$, since the average gas temperature $\langle T_g\rangle$ is different in each case at time t=10 as a result of the different times scales in these cases, as seen in FIG. 2.

As the particle thermal response time, $\tau_{th}$, increases, the amount of heat transferred, $Q_{pg}$, from the particles to the fluid becomes less pronounced.

On the other hand, low $\tau_{th}$, as in FIG. 8A, leads to higher heat transfer to the fluid phase. This heat is subsequently transported throughout the flow, through diffusion, making the flow more thermally homogeneous.

When considering particle-laden, reactive flows, the fluid and particle characteristics at the ignition point are critical for an efficient combustion. Inhomogeneities in either phase can lead to undesired or inefficient combustion behavior. In order to optimize the flow configuration at ignition and obtain an homogeneous heat release and distribution, several parameters should be taken into consideration such as, the induction heating and particle thermal timescales, heat diffusion in the fluid phase and particle clustering.

FIGS. 9A and 9B illustrate the time evolution of the temperature spectrum for case I1T1000. More precisely, this corresponds to the spectrum of the temperature fluctuations.

The profiles of the temperature spectrum in FIG. 9A are taken at various time steps during the transient regime from t=0 to 10 (regime 1). During this time, the domain average gas temperature fluctuations are increasing, recall FIGS. 7A and 7B.

FIG. 9B corresponds to the regime t=10 to 30 (regime 2) where the gas temperature fluctuations decrease.

In regime 1 (FIG. 9A), as the temperature fluctuations are developing, the temperature spectrum increases although the temperature distribution in the large wavenumbers saturate very early during the transient in the evolution.

At the later stage of regime 1 (t=8 to 10), the low wavenumbers start to saturate and the profiles of the fluctuating temperature spectra collapse.

Regime 2, corresponding to FIG. 9B, represents the evolution towards a steady-state regime. In regime 2, the temperature fluctuations decrease, nearly uniformly, across all scales as the heat diffusion within the gas phase becomes dominant. Being a turbulent flow, this process is multi-scale in nature.

To evaluate and quantify particle clustering effects, the Radial Distribution Function (RDF) is computed. The RDF statistically describes the particle distribution in space. The RDF represents the probability to find a particle at a distance from another particle. If particles are uniformly distributed, the corresponding RDF is invariant to the distance between particles. Peaks in the RDF represent a preferential particle clustering.

The RDF is given by:

$$RDF(r) = \frac{dN_p(r)}{4\pi r^2 n_0 dr} \tag{9}$$

where N(r) represents the number of particle at a distance between r and r+dr from a reference particle and $n_o$ is the particle concentration or number of particles per unit volume.

FIGS. 10A and 10B show the time evolution of the RDF for cases I∞T0 and I1T10, respectively.

As can be seen, particle clustering increases, at least initially, for both cases I∞T0 and I1T10 as the isotropic turbulence starts to decay from t=0. This occurs irrespective of the presence (I1T10) or absence (I∞T0) of induction heating. However, the evolution of the RDF is not systematic. The particle clustering first increases and then decreases with time.

Figure 11:
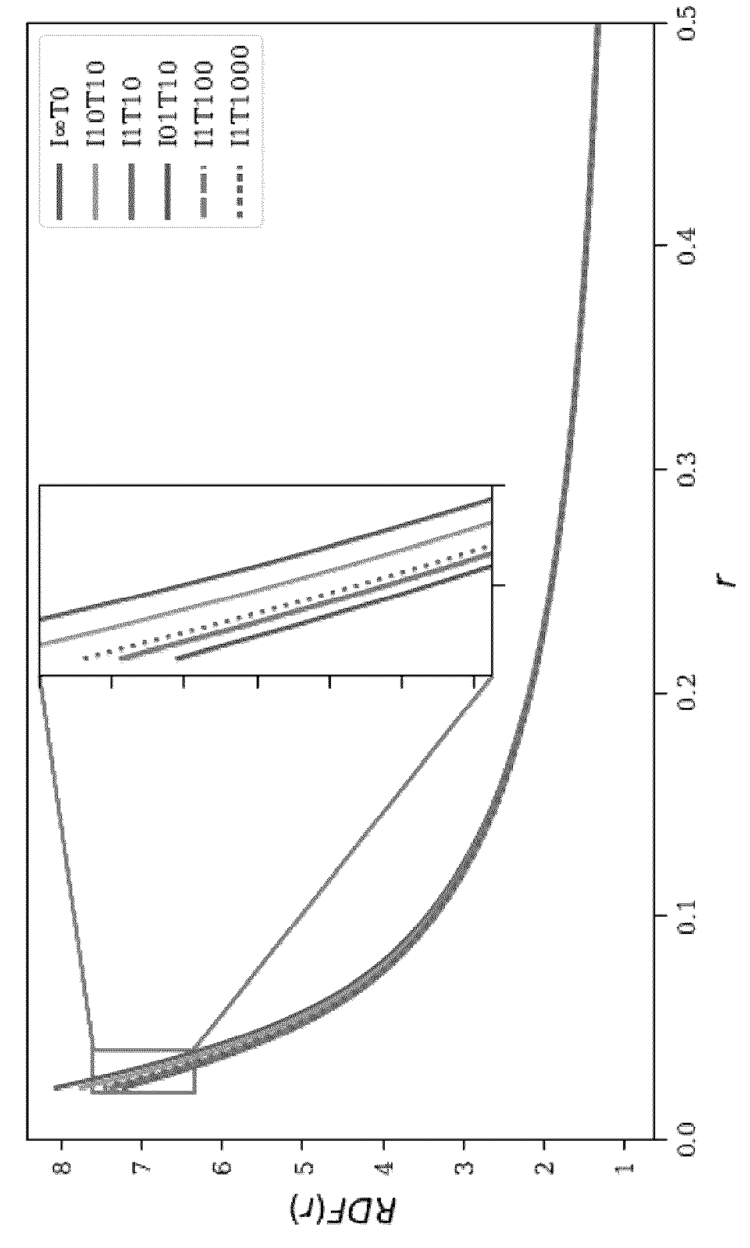
FIG. 11 is a graph illustrating RDF of all cases at t=30.

To compare the clustering magnitude for different cases, the RDF of all cases at time t=30 is plotted in FIG. 11.

The particle thermal response time does not have any significant effect on clustering, at least for the cases studied here.

On the other hand, clustering decreases by decreasing the induction timescale which corresponds to higher heating rates. A more intense heating will most significantly modify the small scale turbulent structures by increasing the Kolmogorov length scales and accumulating energy at high wavenumbers. We note that large structures are not directly affected by the particle heating and are similar in all cases, the only difference in the carrier phase occurs at the small turbulent structures.

Metallic particles within an underlying turbulent flow field can be inductively heated by an external alternating current magnetic field, through the hysteresis and/or eddy current mechanisms.

The heating occurs up to the Curie temperature of the material at which point, the particle loses its magnetic potential and further heating is impeded.

The present disclosure provides a numerical model, and systems and methods using and implementing the model, for the induction heating of solid particles.

The numerical model is based on the characterization of an induction timescale. The inductively-heated particles transfer thermal energy to a carrier gas which results in the bulk heating of the fluid.

The time scales for the induction heating as well as the heat transfer to the fluid impact the turbulence decay rate, bulk temperature, and turbulence characteristics of the carrier gas.

A faster decay in the turbulent kinetic energy is due to the temperature-dependent viscosity of the carrier phase.

Higher temperature leads to higher viscosity which enhances energy dissipation and growth of the Kolmogorov turbulent scales.

Energy accumulation in the energy spectrum is observed at high wavenumbers compared to a traditional decay of particle-laden turbulence.

Additionally, the value of E(k) at which the energy is accumulated highly depends on the transient turbulent regime. The value of the plateau remains high as long as the transient regime is developing. The energetic plateau is much lower when the Curie temperature is reached. The energetic plateau at which the turbulent kinetic energy accumulates does not depend on the Kolmogorov scale of the flow.

Furthermore, the root mean square of the temperatures of both phases show an opposite behavior when the particle thermal response time is increased. This is mainly due to the amount of energy transferred to the gas phase and to its thermal diffusion property which may be a matter of future investigation.

Two sub-regimes could be identified in the transient regime: 'regime 1' and 'regime2'.

In 'regime 1', temperature fluctuations in both phases develop up to a certain limit, at which point, 'regime2' starts where these fluctuations begin to drop.

In 'regime 1', the thermal energy distribution is constant in time over all scales except for a slight increase at lower wavenumbers—the scale which the heating occurs.

On the other hand, in 'regime2' a decay in thermal energy with time at all scales is observed.

The temperature spectrum is also affected in regimes 1 and 2. In regime 1, the temperature spectrum increases with time up to a critical state which could not be surpassed no matter how long the regime 1 extends. In regime 2, the temperature fluctuations decrease monotonically with time at all scales similar to the behavior of the energy spectrum time evolution with no particle heating.

The preferential particle clustering further impacts the carrier and dispersed phase temperature distribution. More aggressive heating leads to higher energy content in the small scale turbulent structures. This, in turn, increases the turbulence decay rate which decreases the particle clustering.

Grid convergence study details will now be discussed.

In order to assess the grid independence of the analysis of the present disclosure, the results for the simulation I1T10 with $256^3$ and $512^3$ grids were shown.

FIGS. 12A and 12B represent an energy spectrum of the $256^3$ and $512^3$ simulations, in the statistical steady state regime with no induction (FIG. 12A) and in the decaying regime with induction (FIG. 12B), at different times corresponding to the same TKE in each regime.

As can be seen, the two curves collapse for most of the wavenumbers in the two cases except for the highest wavenumbers in the second case where induction heating is on.

This is expected, since in the $512^3$ case, there are two times the number of wavenumbers (256 compared to 128 for the $256^3$), meaning that at these wavenumbers, less energy is contained per wavenumber to ultimately get the same TKE as the one for the $256^3$ case.

Moreover, since induction heating is on, the value of E(k) at which the energy is accumulated is higher compared to the no induction case as discussed previously.

Consequently, the difference between the two curves at high wavenumber is more evident when induction is on. Further, the wavenumber at which the energy starts to accumulate is identical in the decaying regime for both the $256^3$ and $512^3$ simulations.

Various applications of the description above, including the induction heating model for dispersed metallic particles and systems and methods using or implementing the model or aspects thereof, will now be described. The model comprises a model for solid particle heating through hysteresis and Joules induction mechanisms as the dispersed particles evolve in a high-frequency external alternating magnetic field.

Figure 13:
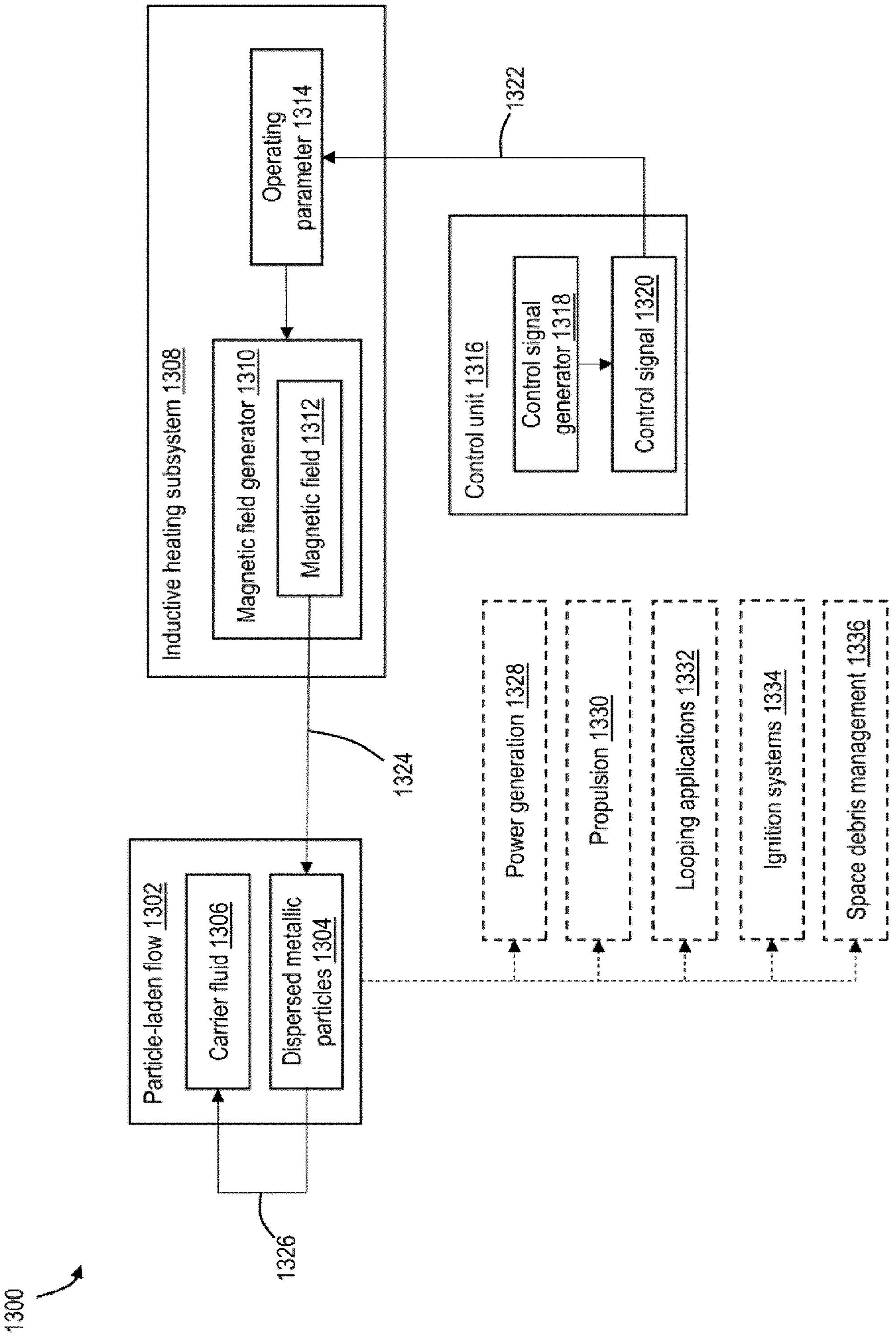
FIG. 13 is a block diagram of a system for inductive heating of dispersed metallic particles, according to an embodiment.

Referring now to FIG. 13, shown therein is a system 1300 for inductive heating of dispersed metallic particles, according to an embodiment.

The system includes a particle-laden flow 1302 including a dispersed or particle phase including dispersed metallic particles 1304 and a carrier or fluid phase including a carrier fluid 1306. The carrier fluid 1306 may be a gas or a liquid. The particle-laden flow 1302 may be a particle-laden turbulent flow. The carrier fluid 1306 may be a turbulent carrier fluid.

The system 1300 includes an inductive heating subsystem 1308 for inductive heating of the dispersed metallic particles 1304. The inductive heating subsystem 1308 includes a magnetic field generator 1310 for generating a magnetic field 1312. The magnetic field generator 1310 may include a magnetic coil. The magnetic field 1312 may be an alternating magnetic field. The alternating magnetic field may be a high-frequency alternating magnetic field. The inductive heating subsystem 1308 also includes one or more operating parameters 1314. The operating parameters 1314 control operation of the magnetic field generator 1312, such as by controlling the output of the magnetic field generator 1312. The operating parameter 1314 may include a magnetic field frequency or a magnetic field magnitude. Further, other parameters of the inductive heating subsystem 1308 such as magnetic field generator component size and geometry (e.g. magnetic coil size, geometry) may be selected according to the desired effect of the inductive heating subsystem 1308 on the particle-laden flow 1302.

The system 1300 includes a control unit 1316 for controlling the operating parameter 1314 of the inductive heating subsystem 1308. The control unit 1316 includes a control signal generator 1318 for generating a control signal 1320. The control signal 1320 can be sent from the control unit to the inductive heating subsystem 1308 (at 1322) for controlling the operating parameter 1314. The control signal 1320 may be used to set the operating parameter 1314 or to adjust the operating parameter 1314. The control signal 1320 may be determined by the control unit 1316 automatically or via a user-provided input. The control unit 1316 may include a computing device, such as a processor and a data storage (e.g. memory), or other components configured to generate and communicate the control signal 1320.

Generally, the control unit 1316 can be used to control the operating parameter 1314 to control a flow parameter of the particle-laden flow 1302. The flow parameter may be any one or more of an induction heating timescale, a particle thermal timescale, a heat diffusion in the carrier phase, and a particle clustering of the dispersed metallic particles 1304.

The inductive heating subsystem 1308 inductively heats 1324 the dispersed metallic particles 1304 via the magnetic field 1312. The heating may occur via hysteresis or eddy current mechanisms.

The inductively-heated particles 1304 transfer thermal energy 1326 to the carrier fluid 1306 which results in the bulk heating of the fluid. By inductively heating the dispersed metallic particles 1304, a time-dependent temperature rise can result in a time-varying heat transfer 1326 to the carrier fluid 1306. Time-dependent induction heating of the dispersed metallic particles 1304 can result in a local heating of the carrier fluid 1306 surrounding the solid phase. The increased temperature results in thermodynamic and thermophysical changes of the carrier fluid 1306, more specifically a decrease in the local density and an increase of the local viscosity. These can directly affect the local turbulence characteristics in the flow.

The time scales for the induction heating as well as the heat transfer to the carrier fluid 1306 may impact the turbulence decay rate, bulk temperature, and turbulence characteristics of the carrier fluid 1306.

More aggressive heating may lead to higher energy content in the small scale turbulent structures. This, in turn, may increase the turbulence decay rate which decreases the particle clustering.

The flow parameter of the particle-laden flow 1302 may be controlled according to an induction heating model. The induction heating model may include model parameters including the induction heating timescale, an initial temperature of the dispersed metallic particles, and a Curie temperature of the dispersed metallic particles, where the initial temperature and the Curie temperature are known and the induction heating timescale is a user-defined model parameter.

The operating parameter 1314 may be a frequency of the magnetic field 1312, and the control unit 1316 may adjust the frequency to decrease the induction heating timescale to produce a more homogeneous thermal distribution of the carrier fluid 1306.

The particle-laden flow 1302, and more broadly the system 1300, may be used in various applications, such as power generation systems 1328, propulsion systems 1330, looping applications 1332, ignition systems 1334, and space debris management systems 1336.

In some embodiments, the particle-laden flow 1302 may be used as a fuel, and the system 1300 may be a component of a heating ignition system 1334 for igniting the fuel via a combustion or convection process.

In some embodiments, the particle-laden flow 1302 may be used as a fuel, and the system 1300 may be a component of a power generation system 1328 for a vehicle or a propulsion system 1330 for a vehicle. The vehicle may be a land-based vehicle, a water-based vehicle, an air-based vehicle, or a space-based vehicle.

The particle-laden flow 1302 may be used as a fuel, and the system 1300 may be a component of a heating ignition system 1334 for two dimensional surface heating or three dimensional volumetric heating.

In some embodiments, the particle-laden flow 1302 is a fuel or a component of a fuel. The fuel may be a nanothermite-based fuel or a micro-thermite-based fuel. The system 1300 may be a component of an ignition system 1334 for igniting the nanothermite-based or micro-thermite-based fuel.

A method for inductively heating ferro-magnetic particles dispersed in a fluid is provided. Through localized heating of the particles in a turbulent flow, an inhomogeneous particle dispersion mechanism may be achieved. Localized heating of the particles in a gas may impede turbulence. Inductively heating clusters of distributed particles may result in strong inhomogeneities of the temperature of the gas. A heating apparatus of dispersed metallic particles within a gas may reach a maximum temperature defined by a Curie temperature of the particles. Induction heating of clustered dispersed metallic particles may enhance local mixing via buoyancy-driven effects in a liquid or liquid-like supercritical fluid. Forcing of the turbulence at specific frequencies may enhance local particle clustering. Such an approach may be used to separate polydispersed metallic particles within a turbulent flow. Induction heating of polydispersed particles in a turbulent flow may occur via hysteresis and Joule heating. Size and geometry of the particles may dictate a relative importance of each heating method. Rapid induction heating of the dispersed particles may enhance local turbulence, thus improving mixing in a gaseous fluid. Local clustering of particles in the turbulent flow may inhibit particle-to-fluid heat transfer. Ferri-magnetic particles may also be used in the induction heating. Ferri-magnetic particles have a lower electric conductivity, so Joules effects are less pronounced compared to ferro-particles and Ferri-magnetic particles heat primarily due to hysteresis which is a more controllable process. That is why ferrimagnetic are used in hyperthermia medical applications (e.g. inserting nano ferrimagnetic particles in a cell to heat and destroy it), as well as the fact that Ferri-magnetic particles have improved non-toxicity and biological compatibility compared to Ferro-magnetic particles.

The present disclosure further provides are systems and methods for dispersal of metallic particles, systems and methods of utilizing magnetohydrodynamics for motility of magnetic particles, systems and methods for use and applications on Earth and in space (in orbit, surface, and subsurface on celestial bodies), systems and methods for heating and combustion of dispersed particles for processing, manufacturing, recycling, and synthesis of metallic particles, systems and methods for two dimensional (2D) surface area and three dimensional (3D) volumetric heating, systems and methods for dispersion for laminar and/or turbulent flow for time-dependent and/or temperature-dependent reactions, systems and methods for ignition using induction and/or other electromagnetic radiation, and systems and methods for repairing systems.

The system for heating of dispersed metallic particles may be used or implemented in various industrial applications and may enable systems provided various advantages over existing systems.

The system for heating of dispersed metallic particles may be used in a system for generating propulsion for a transport vehicle.

The system for heating of dispersed metallic particles may be used in a system for power generation for a transport vehicle.

The system for heating of dispersed metallic particles may be used in a system for using recyclable fuels for propulsion or power.

The system for heating of dispersed metallic particles may be used in a system for heating to support propulsion to power transport vehicles.

The system for heating of dispersed metallic particles may be used in a system for maneuvering using a mixture of multi-phase particle (solids, liquid gases, and/or plasma).

The system for heating of dispersed metallic particles may be used in a system for utilizing recyclable fuels and wireless power transfer to recycle power and propulsion systems for transport vehicles.

The system for heating of dispersed metallic particles may be used in a system for converting heat to electrical power.

The system for heating of dispersed metallic particles may be used in a system for converting heat to electromagnetic power.

The system for heating of dispersed metallic particles may be used in a system for converting heat to electric power combusting nanoenergetic composites.

The system for heating of dispersed metallic particles may be used in a system for converting heat to electric power using nanoenergetic composites through convection.

The system for heating of dispersed metallic particles may be used in a system including a chemical looping mechanism for recycling and reusing fuels.

The system for heating of dispersed metallic particles may be used in a system for dynamic power management in one or more domains including land, air, water, and space.

The system for heating of dispersed metallic particles may be used to provide energy to a vehicle. The vehicle may be a land-based vehicle, a water-based vehicle, an air-based vehicle, or a space-based vehicle. The type of vehicle is not particularly limited.

The system for heating of dispersed metallic particles may be used in a system for triggering chemical reactions that occur at specific Curie temperatures.

The system for heating of dispersed metallic particles may be used in a system for designing an alloy of two or more materials to meet a defined Curie temperature.

The system for heating of dispersed metallic particles may be used in a system for fast pre-heating of static in-contact stored micro-nano particles up to a defined temperature before releasing them in a carrier fluid (contact between particles tremendously increase the heating rater through Joules heating before dispersion).

The system for heating of dispersed metallic particles may be used in a closed system for converting solar energy to targeted heating. For example, solar energy to electricity to magnetic field to particles induction heating to localized heating.

The system for heating of dispersed metallic particles may be used in a multistage targeted heating system made of different combinations of particles sizes, materials, and Curie temperatures.

The system for heating of dispersed metallic particles may be used in a multistage heating system providing thrust.

The system for heating of dispersed metallic particles may be used in a system for triggering combustion of reactants at Curie temperature.

The system for heating of dispersed metallic particles may be implemented in a controlled release system.

The system may be a catalyst-based system.

The system may be a conjugate system. The system may be matrix-based or membrane-based. The system may be stimuli-responsive. The system may be chemically, mechanically, magnetically, or thermally driven, or the like.

The system may use grafting methods, multi-coated, multi-layered structures for fuel sources.

The system may be a self-excited system. The fuel may be coated with a catalyst to drive a reaction.

The metallic particles inductively heated or dispersed using the systems and methods of the present disclosure may be used in or as a component of a fuel. The fuel may be used in a system which includes a system for inductive heating of dispersed metallic particles as described herein. The fuel may be engineered or manufactured to include particular properties.

The fuel may use a core shell technology (organic and inorganics). The fuel may be a self-assembled nanomaterial.

The fuel may include a nanocarrier (metal, inorganic) and/or nanowires or the like for application-specific use cases.

The fuel can be used to enable an application. Properties of the fuel may be manipulated, varied, or engineered to drive a particular application. Properties of the fuel that may be engineered may include, for example, any one or more of shape, size, surface charge, surface area, surface functionality, porosity, composition, size distribution, structure, and concentration. Further, the properties of the fuel that may be engineered include configuration and shape. Configurations and shapes may be three dimensional. Configuration or shape may be any one or more of a wire, a cone, a sphere, a torus, a cylinder, a cuboid, a prism, a dodecahedron, an icosahedron, a pyramid, a flake, a fiber, or the like.

The system for heating dispersed metallic particles may be implemented in a power generation system.

The power system may advantageously be a clean energy power system. Byproducts of nanothermite reactions are clean energy. The byproducts do not produce toxic chemicals and do not contribute to greenhouse gases.

The power system may use temperature controlled volumetric heating. Temperature controlled volumetric heating may provide increased efficiencies and complete combustion.

The power system may be integrated into existing infrastructure. Such integration may advantageously reduce capital expense.

The power generation system may use nanothermites or microthermites mixed with an inert carrier liquid and/or gas. In doing so, the power generation system may produce clean energy continuously and on-demand.

In some cases, the power generation system may be implemented in a thermal power station.

The power generation system may be configured to convert heat to electrical power. The power generation system may convert heat to electric power by combusting nanoenergetic composites. The power generation system may convert heat to electric power using nanoenergetic composites through convection.

The power generation system may perform metallic fuel power generation by simple oxidation of metallic powders or by energetic release from existing metallic molecular nano- or micro-particles operating in a fluid and/or plasma at certain levels of dispersion.

The system for heating of dispersed metallic particles may be used in a propulsion system. The propulsion system may be for a vehicle. The vehicle may be land-based, water-based, air-based, or space-based. The vehicle may be, for example, an automobile (e.g. car, truck), a boat (e.g. cruise-liner), an aircraft, an aircraft drone, a balloon, or an airship.

The propulsion system may be implemented in an earth-to-orbit transportation system. The earth-to-orbit transportation system may be a rocket launch system. The rocket may be a single stage or multi-stage system. The earth-to-orbit transportation system may be a non-rocket launch system, such as a balloon launching. The propulsion system may be used impulse drivers (space cannons).

In some cases, wireless power may be used to augment thrust of the vehicles.

The dispersed metal particles of the present disclosure may be used in or as a fuel (or fuel source).

The fuel source may include a reactive metal compound. The fuel source may include a material with magnetic properties. The fuel source may include a solid, a gas, a liquid, and/or a plasma. The fuel source may include a synthetic polymer or a non-synthetic polymer. The fuel source may include a thermoplastic. The fuel source may include a mixture of layers of metals, alloys, or the like. The fuel source may include a multi-coated metal with a metamaterial. The fuel source may include a hybrid mixture of reactive metal compounds in liquid and inert states. The fuel source may include a solid propellant, an explosive formulation, an engineering ceramic precursor, a semi-solid metal, a conductive paste, a pharmaceutical, or a slurry. The fuel source may have different particle length scales. The fuel source may include two or more components with distinct properties. For example, the fuel source may include a soft binder component for cohesion and flow and a hard particulate component. The fuel source may have a large contact surface and internal/external friction high resistance to flow. The fuel source may be a thermoplastic, a natural polymer, a synthetic polymer, or a hydrogel. The fuel source may include a metal powder. The fuel source may include a complex compound in the form of a nanothermite or a microthermite. The fuel source may include a core shell and/or other configurations or geometries to optimize for power, propulsion, or the like.

In some cases, a hybrid synthesis method may be used to produce an application specific fuel material. The hybrid synthesis method may include any one or more of additive manufacturing, physical mixing, chemical mixing, emissive or missive methods, vapor deposition, pyrolysis, microwave-assisted synthesis, ball milling, exfoliation, sonochemical methods, arc-discharge methods, or the like.

The size of the fuel may vary. The size of the fuel may be on the micro scale or nano scale.

Figure 14:
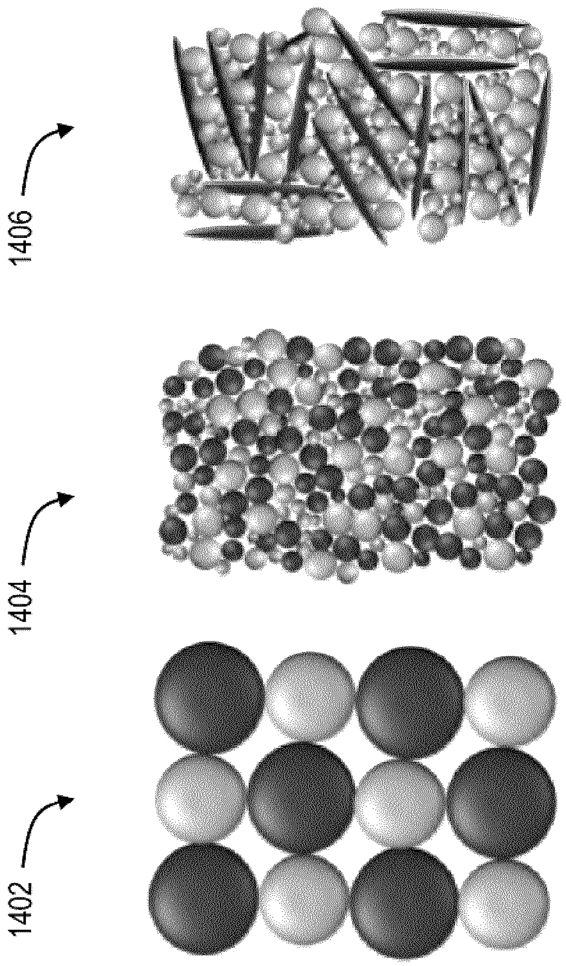
FIG. 14 is a graphical representation of a microthermite, a nanothermite, and an ordered thermite, according to embodiments.

The dispersed metallic particles may be part of a fuel. The fuel may be a component of a thermite. The thermite may be a microthermite, a nanothermite, or an ordered thermite. Example representations of a microthermite 1402, a nanothermite 1404, and an ordered thermite 1406 are shown in FIG. 14, according to embodiments.

The nanothermite may be a metastable intermolecular composite (MIC). The MIC is composed of a fuel and an oxidizer. The fuel may be a metal and the oxidizer may be a metal oxide. As both the oxidizer and the fuel compose each particle (which may be on the scale of 100 nm or less) the energy release per mass of particle can be very large.

The fuel source may be a heterogeneous material. The heterogeneous material may be a solid propellant. The heterogeneous material may be an explosive formulation. The heterogeneous material may be an engineering ceramic precursor. The heterogeneous material may be a composite. The heterogeneous material may be a semi-solid metal. The heterogeneous material may be a conductive paste. The heterogeneous material may be a pharmaceutical. The heterogeneous material may be a slurry.

The heterogeneous material may have different particle length scales.

The heterogeneous material may include two or more components with distinct properties. For example, the heterogeneous material may include a soft binder component for cohesion and flow and a hard particulate component. The heterogeneous material may have a large contact surface and internal/external friction high resistance to flow.

The fuel source may be a thermoplastic. The thermoplastic may be a nylon, a cellulosic, a polyethylene, a polystyrene, a vinyl, or an acrylic.

The fuel source may include metamaterials, thermites, or nanothermites.

The fuel source may include gases and/or liquids.

The fuel source may include natural polymers or synthetic polymers.

The fuel source may be synthesized as a simple linear-chain structure or may be cross-linked.

Figure 15:
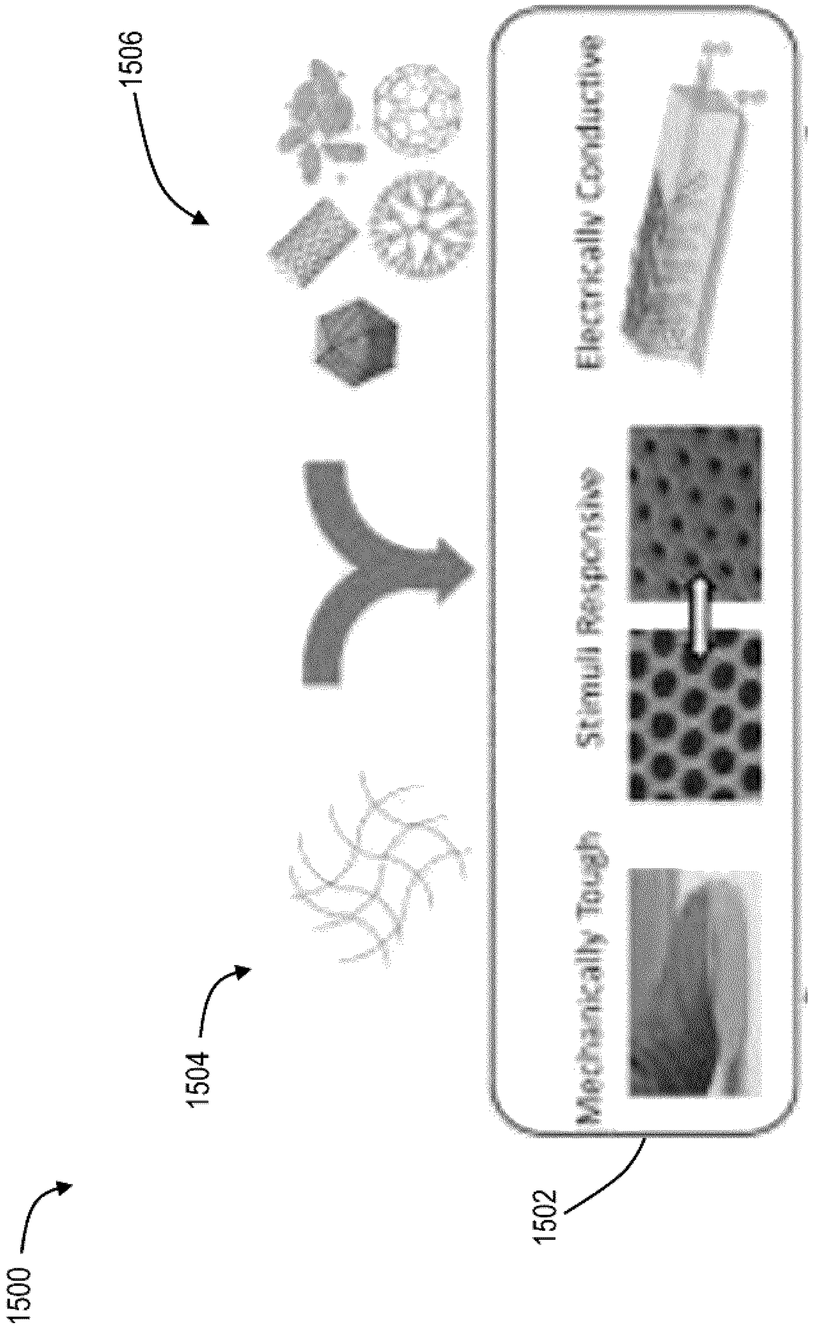
FIG. 15 is a graphical representation of a synthesis process for a nanocomposite hydrogels from natural or synthetic polymers and nanomaterials, according to an embodiment.

The fuel source may comprise a nanocomposite hydrogel. The nanocomposite hydrogel may be synthesized from one or more natural or synthetic polymers and one or more nanomaterials. The nanocomposite hydrogel may be mechanically tough. The nanocomposite hydrogel may be stimuli responsive. The nanocomposite hydrogel may be electrically conductive. FIG. 15 illustrates an example process 1500 of synthesizing nanocomposite hydrogels 1502 from natural or synthetic polymers 1504 and nanomaterials 1506, according to embodiments.

The fuel source may be engineered to have a particular combustion or heating profile.

The fuel may include one or more reactive metal compounds.

The fuel may include gases and liquids. The fuel may include synthetic or non-synthetic polymers.

The fuel may include a mixture of layers of metals.

The fuel may include a hybrid mixture of reactive metal compounds in liquid or inert states.

The fuel may be wrapped in a hydrogel or a metamaterial.

Figure 16:
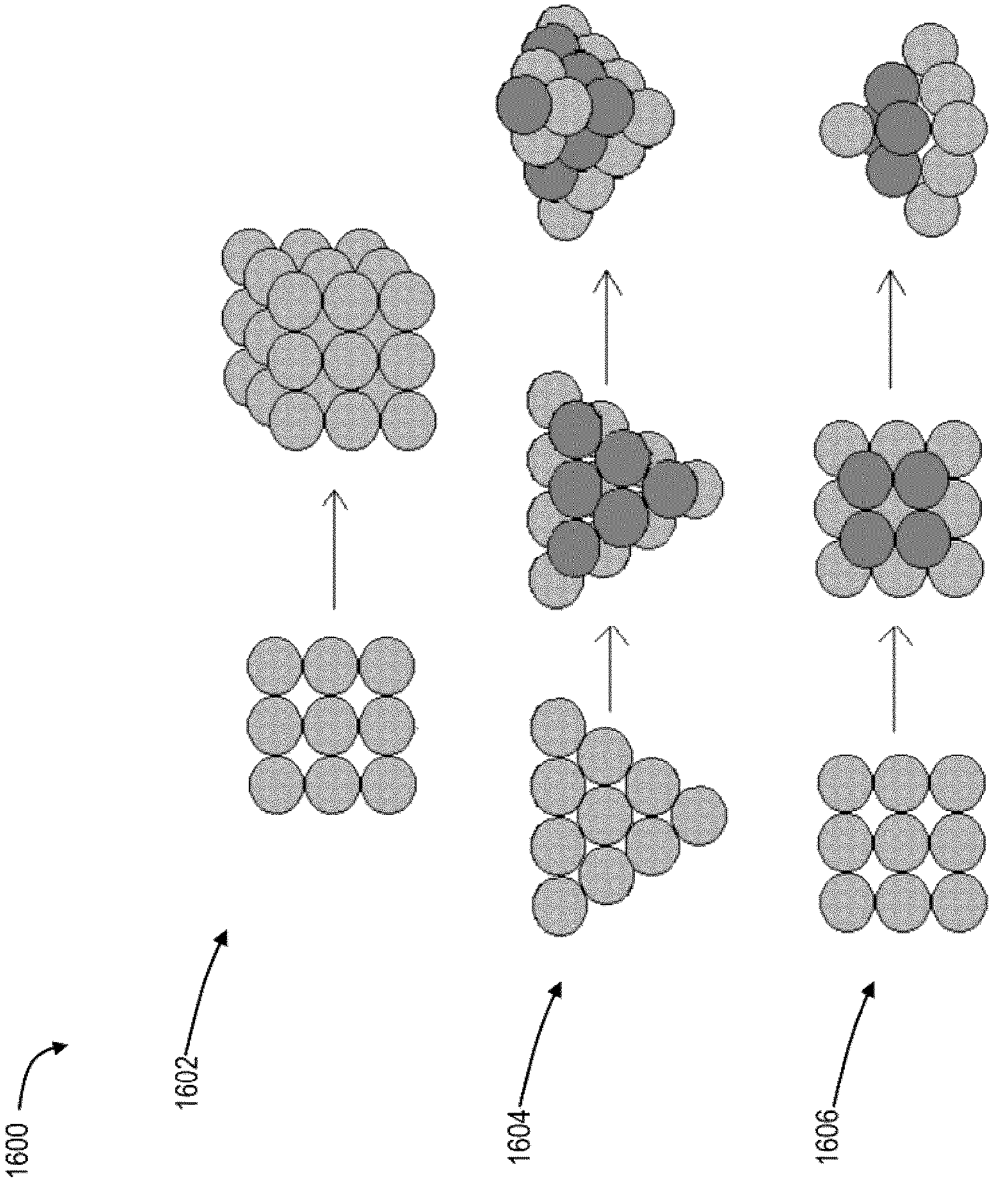
FIG. 16 is a graphical representation of various packing configurations for a fuel source, according to embodiment.

The fuel may have various packing configurations. Example packing configurations 1600 are shown in FIG. 16, according to embodiments. The fuel may have a simple cubic packing 1602. The fuel may have a face-centered cubic packing 1604. The fuel may have a hexagonal packing 1606.

Figure 17:
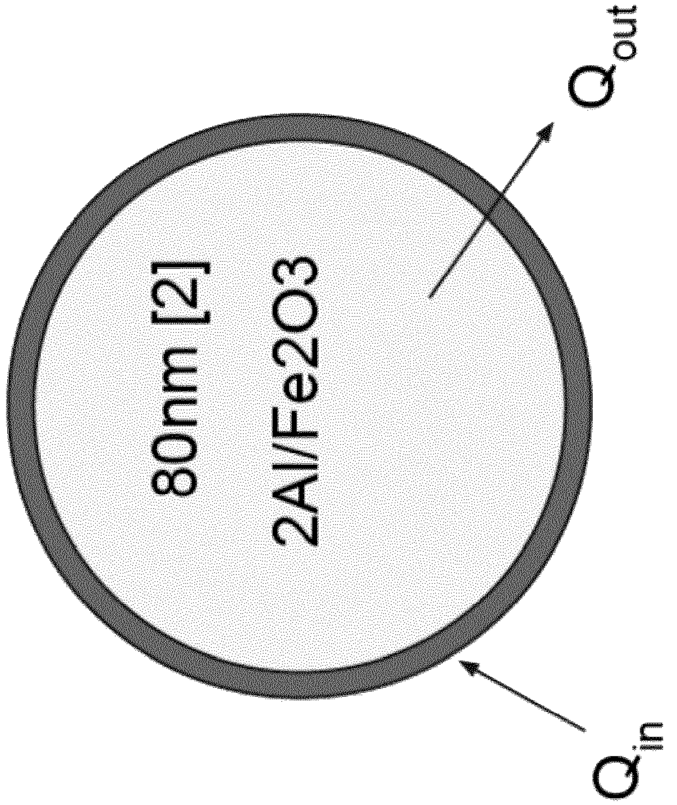
FIG. 17 is a graphical representation of a fuel source, according to an embodiment.

A representation of a fuel source is illustrated in FIG. 17, according to an embodiment.

The systems and methods for heating of dispersed metallic particles may be used in a heating ignition system.

The heating ignition system may be implemented for power or propulsion. The heating ignition system may be implemented for power or propulsion. The system may use induction and/or other electromagnetic radiation to augment processes.

The heating ignition system may include an embedded system where coils and/or wires are embedded in structures.

The ignition system may be used or configuration for 2D heating or 3D heating, which may have different topologies.

Figure 18:
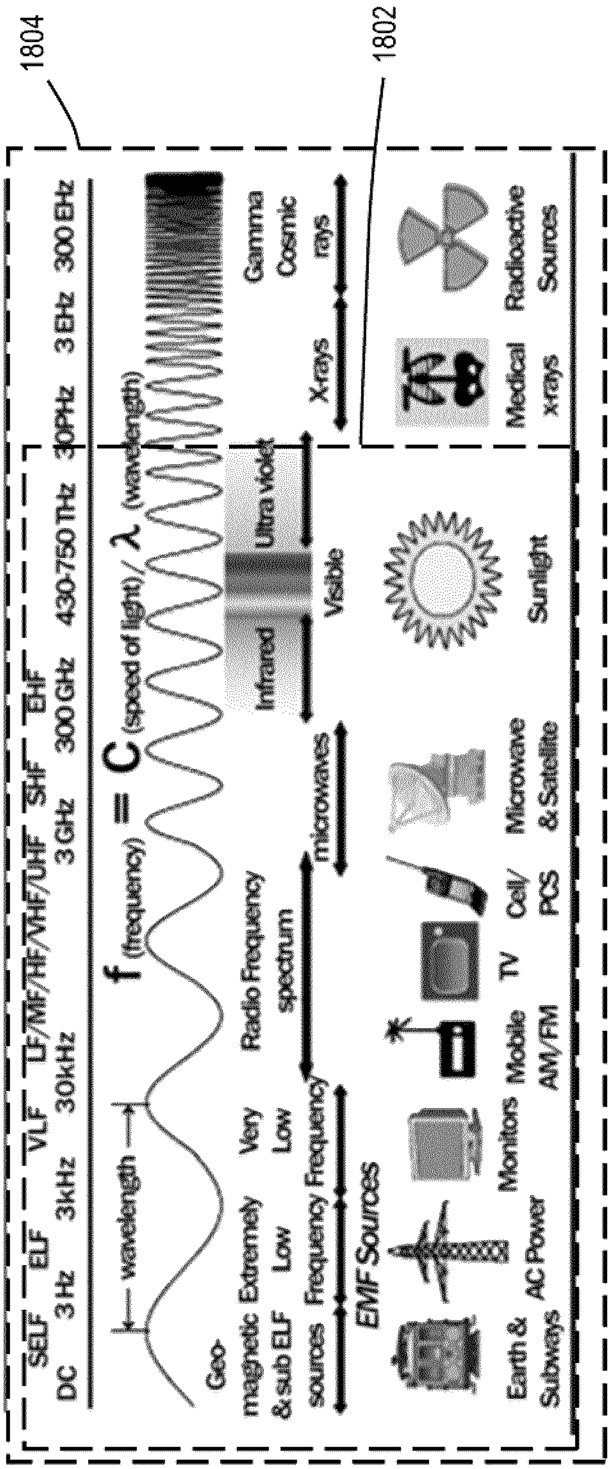
FIG. 18 is a graphical representation of electromagnetic spectrum ranges for aeronautical applications and astronautical applications, according to embodiments.

Various ranges of the electromagnetic spectrum may be used for electromagnetic energy sources in the systems and methods described herein. For aeronautical applications, any one or more of the following may be used: SELF, ELF, VLF, LF, MF, HF, VHF, UHF, SHF, EMF, Geo-magnetic & sub ELF sources, Extremely Low Frequency, Very Low Frequency, Radio Frequency spectrum, Microwaves, Infrared, visible light, ultra violet, and sunlight. For astronautical applications, any one or more of the following may be used: SELF, ELF, VLF, LF, MF, HF, VHF, UHF, SHF, EMF, Infrared, visible light, ultra violet, sunlight, X-rays, Gamma Rays, & Cosmic Rays, Geo-magnetic and sub ELF sources, Extremely Low Frequency, Very Low Frequency, Radio Frequency spectrum, Microwaves, Terahertz, Infrared, visible light, ultra violet, sunlight, X-rays, Gamma Rays, and Cosmic Rays. FIG. 18 shows a graphical representation of electromagnetic spectrum ranges for aeronautical applications 1802 and astronautical applications 1804, according to embodiments.

Power and Data services can be delivered via multiple methods using different frequencies in the EM Spectrum and may be driven by the location of applications and other variables.

Various heating methods may be used or implemented using the systems and methods of the present disclosure.

Heating may include eddy currents, hysteresis, or combination of eddy currents and hysteresis.

Heat transfer may occur by combustion of fuel and/or convection by means of sintering where a metallic fuel is heated but does not reach combustion, and then heat is transferred from the metallic particles to a working fluid.

Double Combustion and multi-stage combustion and or sintering may be implemented where fuel is pre-heated and then transferred to a combustion chamber.

Sintering looping methods may be implemented where both reaction loops are sintering processes.

Additionally, other electromagnetic waves may be used to augment applications such as microwaves, ultrasonics, UV and/or lasers or the like.

Tunable characteristics may be tuned or manipulated to affect local turbulence to increase or decrease Stokes number.

In some embodiments, the systems and methods for heating dispersed metallic particles may be used or implemented in a system for full Combustion of Nanoenergetic Composites (NCs).

NCs may be fully combusted in an induction assembly to turn water into steam. The NCs may undergo a multi-stage combustion, where products of one reaction become the products of another reaction to create heat.

Multi-stage combustion through the use of looping chemical reactions and/or looping metallic reactions, or a combination of looping chemical reactions and looping metallic reactions may be used.

In some embodiments, the systems and methods for heating dispersed metallic particles may be used or implemented in systems or methods for convection of Nanoenergetic Composites.

In the system for convections of NCs, a working fluid is heated by NCs using convection to drive the process. NCs heat the working fluid by way of sintering, so that the following method may occur: (1) NCs are heated; (2) heat transfer occurs from the NCs to the working fluid; (3) phase change in the working fluid creates enough energy to drive the process; (4) NCs cool down; and (5) the process of (1)-(4) is restarted.

A looping system may be implemented for looping applications. Different dispersion techniques may be implemented. For example, different dispersion techniques may be leveraged to burn only a fraction of the thermites in a loop. This may provide a secondary control for purposes of power generation.

Different looping methods may be used. In an embodiment, a first loop is corresponds to a complete combustion and a second loop corresponds to a complete combustion. In another embodiment, a first loop corresponds to a complete combustion and a second loop corresponds to a sintering process. In another embodiment, a first loop corresponds to a sintering process and a second loop corresponds to a complete combustion process. In another embodiment, a first loop corresponds to a sintering process and a second loop corresponds to a complete combustion process. Other looping methods may be used.

Applications of the present disclosure in the context of space debris mitigation and remediation will now be described.

Figure 19:
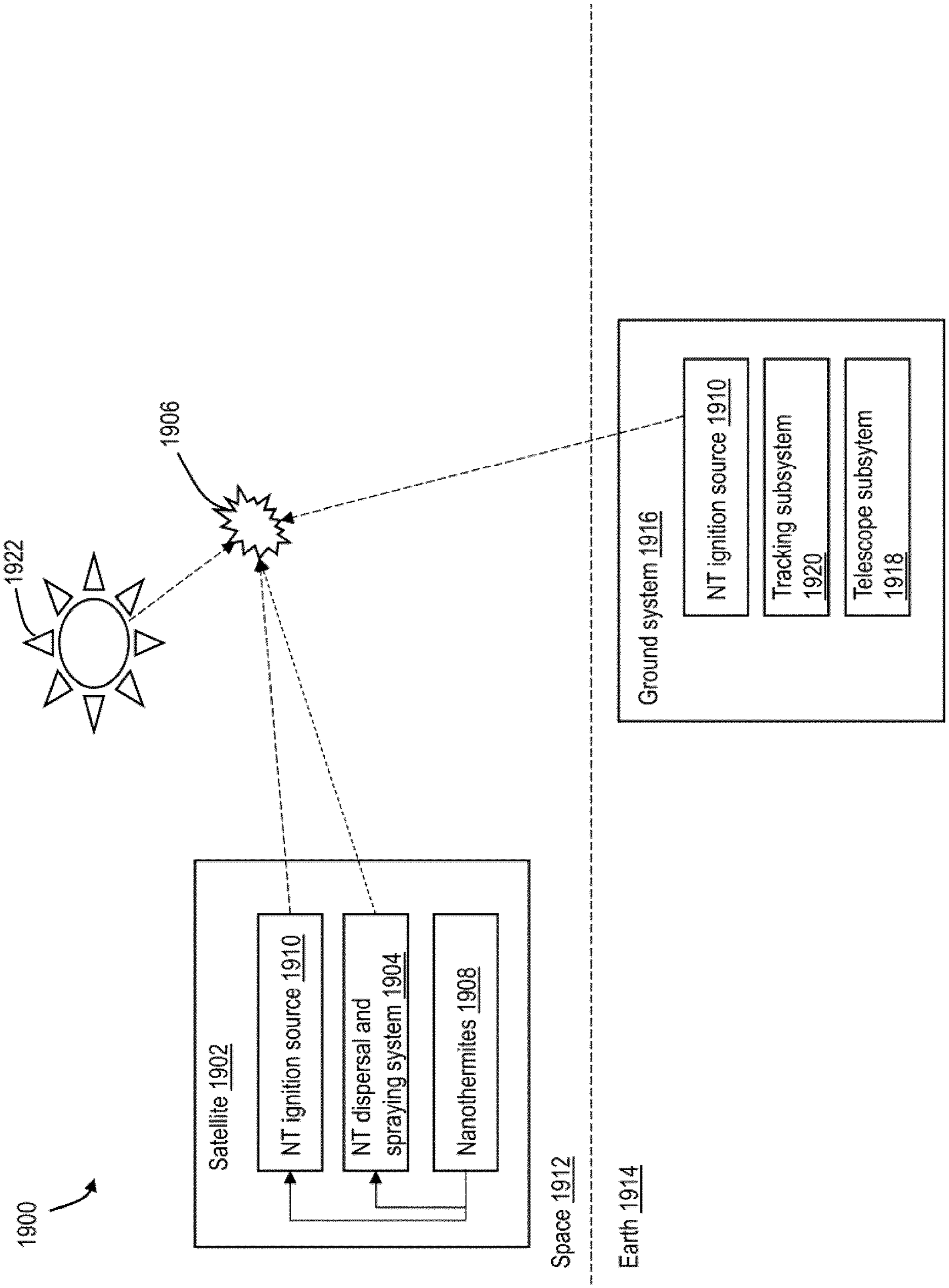
FIG. 19 is a block diagram of a system 1700 for space debris management, according to an embodiment.

Referring now to FIG. 19, shown therein is a system 1900 for space debris management, according to an embodiment. The space debris management system may be used for space debris mitigation and remediation (e.g. moving space debris, deorbiting objects, junk).

The system 1900 includes a satellite 1902. In other embodiments, the system 1900 may include more than one satellite 1902.

The satellite 1902 includes a mixture dispersal system 1904. The mixture dispersal system 1904 is configured to spray and disperse a mixture that may be magnetically coupled to attach to space debris 1906 (good use for small debris). The space debris 1906 may be, for example, bits and pieces of a satellite. The mixture includes a nanothermite (NTs) 1908. The mixture may be or include a nanoenergetic composite.

The system 1900 includes a NT ignition source 1910 for igniting the NTs 1908 in the dispersed mixture. The NT ignition source 1910 may be on the satellite 1902 (satellite-based ignition, in space segment 1912) or may be on Earth 1914 (ground-based ignition) as part of a ground system 1916. By igniting the NTs 1908 using the NT ignition source 1910, a reaction can be caused locally to the NTs 1908, which can cause the space debris 1906 to deorbit. As such, the NTs 1908 may be dispersed and sprayed onto the space debris 1906 or nearby the space debris 1906 (such that the local reaction caused by NT ignition is sufficiently close to move the space debris 1906).

The NT ignition source 1910 is an electromagnetic radiation source for igniting the NTs 1908. The NT ignition source 1910 may be a laser. The NT ignition source 1910 may be a source of microwaves. The NT ignition source 1910 may be located on the same satellite 1902 as the NT dispersal system 1904 or may be located on a different satellite 1902.

The ground system 1916 includes NT ignition source 1910 (which may include a laser), a telescope subsystem 1918, and a tracking system 1920. The telescope 1918 and tracking system 1920 are used to locate and track the space debris 1906. The laser 1910 is used to ignite the located and tracked target (space debris 1906), which may be a spinning target.

Various parameters or factors may be considered by the NT ignition system such as debris orbit, debris orientation, de-orbiting engagement, delta-v, plasma direction surface normal, orbital velocity, and location of the ignition source 1910.

Delta-V direction may be averaged over multiple pulses of the ignition source 1910.

In some cases, the NT ignition source 1910 may be a solar source 1922 (i.e. sunlight).

The systems and methods for heating of dispersed metallic particles described herein may be used in energy generation applications. For example, the system for heating dispersed metallic particles may be a component of or implemented in a system for energy generation.

In an embodiment, the system for heating of dispersed metallic particles may be used in the dispersal of particles for rapid volumetric heating. In an embodiment, the system for heating of dispersed metallic particles may be used in dispersing a fuel source with nanothermite powders and/or a combination of other energetic and magnetic particles.

In an embodiment, the system for heating of dispersed metallic particles may be used in a system using energetic particles as energy carriers. The energetic particles may be heated and/or ignited. The energy of the reaction may be transferred into a working fluid. The reaction may be used in dispersed liquid energy going into the working fluid and for heating of liquid for thermo cycles for power generation or magnetohydrodynamics to drive cycles in a vacuum.

Figure 20:
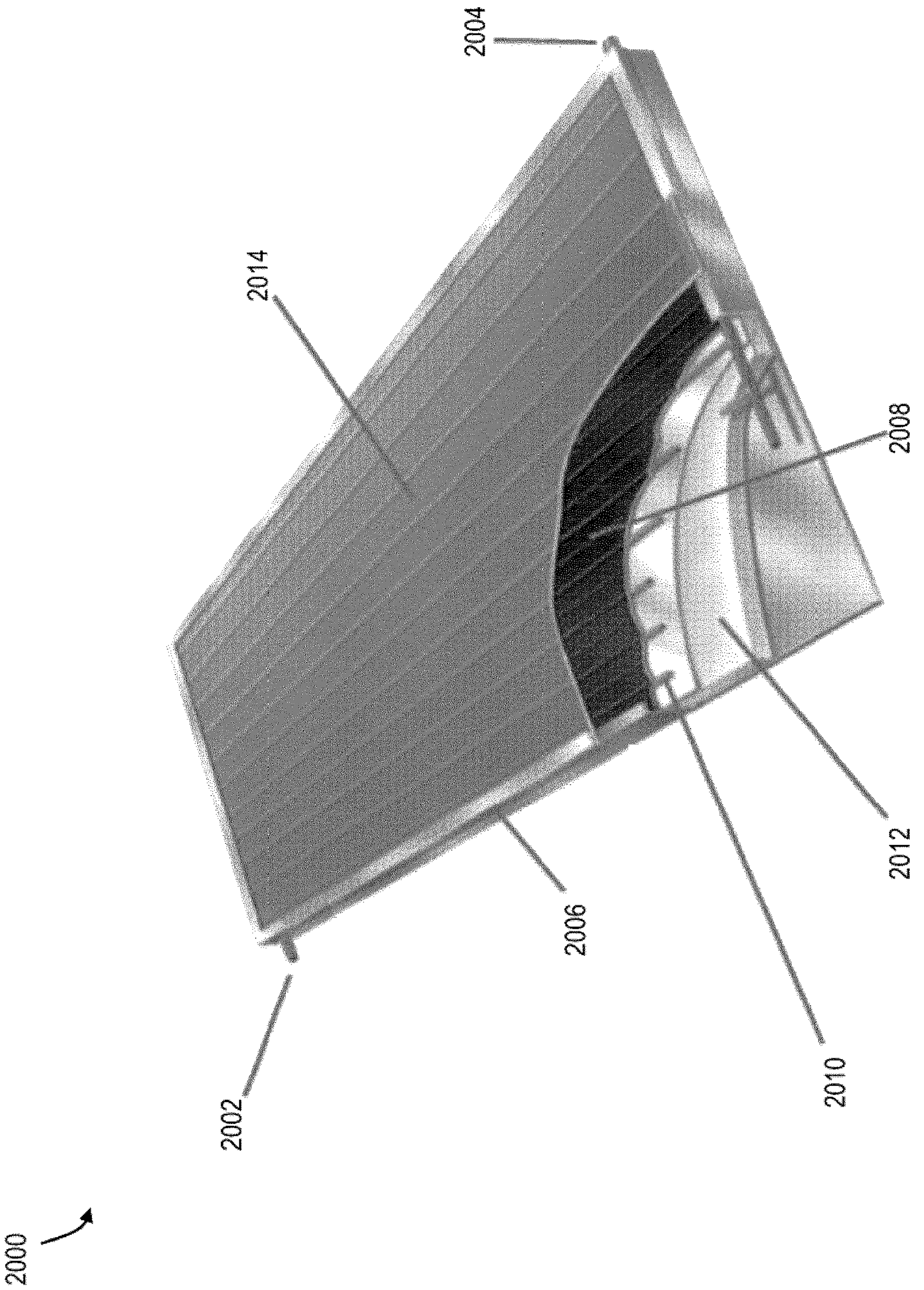
FIG. 20 is a schematic diagram of a solar collector having a portion in cross-sectional view, according to an embodiment.

Referring now to FIG. 20, shown therein is a solar collector 2000 having a portion in cross-sectional view, according to an embodiment. The solar collector 2000 may be used in a heating system.

The solar collector 2000 includes an inlet connection 2002 and an outlet connection 2004. The inlet connection 2002 may be used to bring a fluid, such as a cold water feed, into the solar collector 2000. The outlet connection 2004 may be used to output a fluid from the solar collector 2000.

The solar collector includes a collector housing 2006. The collector housing 2006 may be made from aluminum alloy or galvanized steel. The collector housing 2006 fixes to and protects an absorber plate (absorber plate 2008, described below).

The solar collector 2000 includes a nanothermite (NT)/energetic particle absorber plate 2008. The absorber plate 2008 is disposed inside the collector housing 2006. The NT/energetic particle absorber plate 2008 includes a coating to maximize heat collecting efficiency.

The solar collector 2000 includes a plurality of flow tubes 2010. The flow tubes 2010 may be embedded in the absorber plate 2008. The flow tubes 2010 may be configured to transport fluid from the inlet connection 2002 to the outlet connection 2004.

The solar collector 2000 includes insulation 2012. The insulation 2012 is disposed inside the collector housing 2006 to the bottom and sides of the collector 2000. The insulation 2012 may reduce loss of heat.

The solar collector includes a cover 2014. The cover 2014 protects the absorber plate 2008 and prevents loss of heat.

Figure 21:
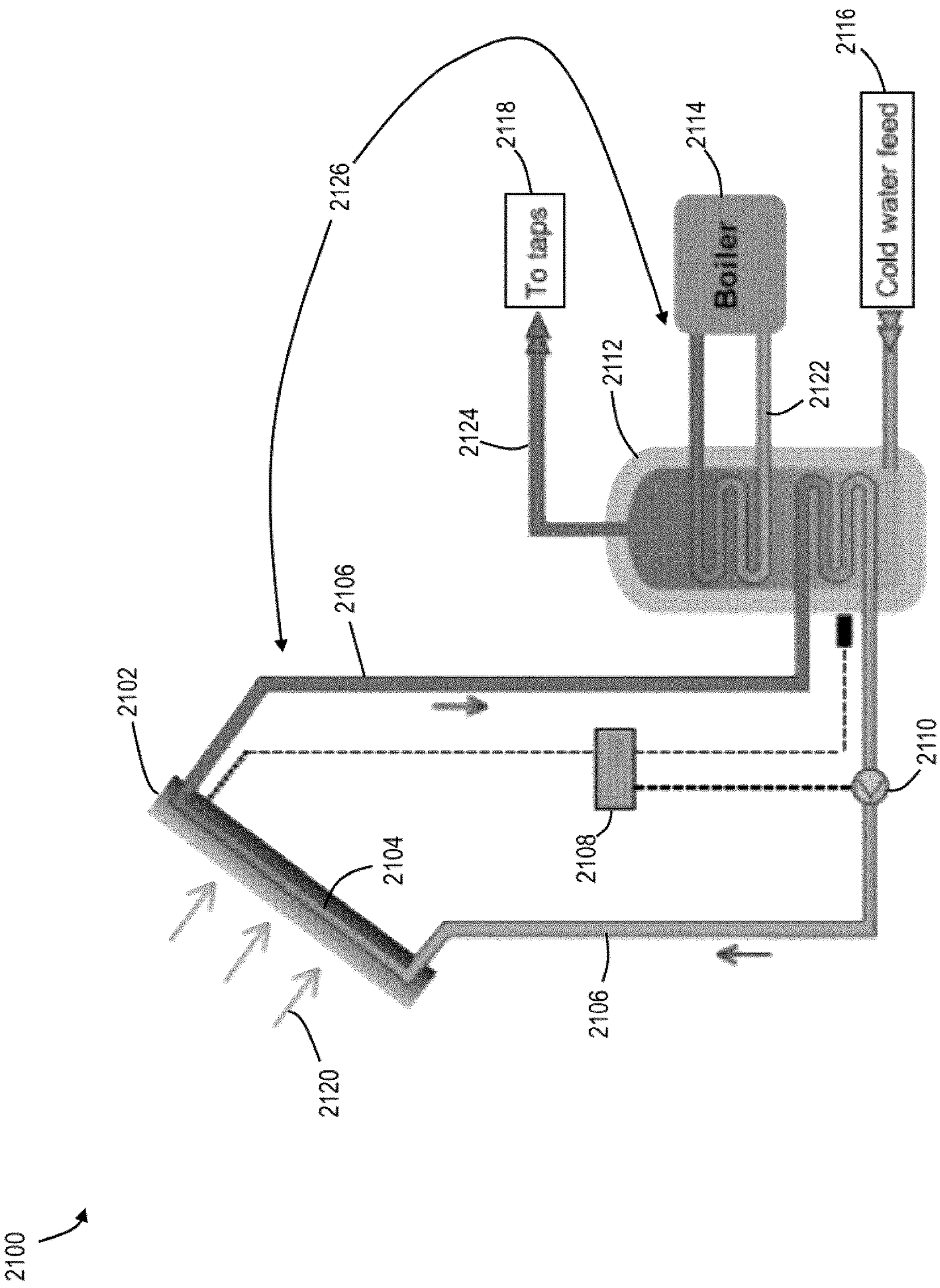
FIG. 21 is a schematic diagram of a heating system using a solar collector, such as the solar collector of FIG. 20, according to an embodiment.

Referring now to FIG. 21, shown therein is a schematic diagram of a heating system 2100 using a solar collector, such as the solar collector 2000 of FIG. 20, according to an embodiment. The system 2100 may use energetic particles or nanothermites as energy carriers. As such, the energetic particles may be heated or ignited and the energy of the reaction transferred to a working fluid.

The system 2100 includes a solar collector 2102 including flow tubes 2104 embedded therein (e.g. flow tubes 2010 of FIG. 20), a fluid transport tube 2106, a controller 2108, a pump 2110, a fluid tank 2112, a boiler 2114, a cold water feed 2116, and a fluid output (to taps) 2118.

The solar collector 2102 may include nanothermites or nanoenergetic particles. The solar collector 2102 may include a layer of nanothermites or nanoenergetic particles.

The cold water feed 2116 supplies cold water to the system 2100, which is fed into fluid tank 2112. The controller 2108 controls the pump 2110 for moving fluid into the fluid transport pipe 2106. The controller 2108 may also control the solar collector 2102 and the fluid tank 2112.

When the pump 2110 is opened by the controller 2108, cold water from the fluid tank 2112 is transported from the fluid tank 2112 to the solar collector 2102 via the fluid transport tube 2106.

The solar collector 2102 is exposed to solar radiation 2120.

The water is heated up in the fluid tubes 2104 in the solar collector 2102.

The heated water is transported from the solar collector 2102 to the fluid tank 2112 via the fluid transport tube 2106.

The boiler 2114 is connected to fluid transport tube 2122, a portion of which is disposed in the fluid tank 2112.

Heated water is sent out of the fluid tank 2112 via fluid transport tube 2124 to the fluid output 2118 (e.g. to taps).

In some cases, the nanothermites or energetic particles may be used in the system 2100 as an energy carrier (for example, at 2126) to increase efficiencies of the solar collector 2102. The nanothermites or energetic particles may be used in the system 2100 to augment heating cycles performed by the heating system 2100.

Figure 22:
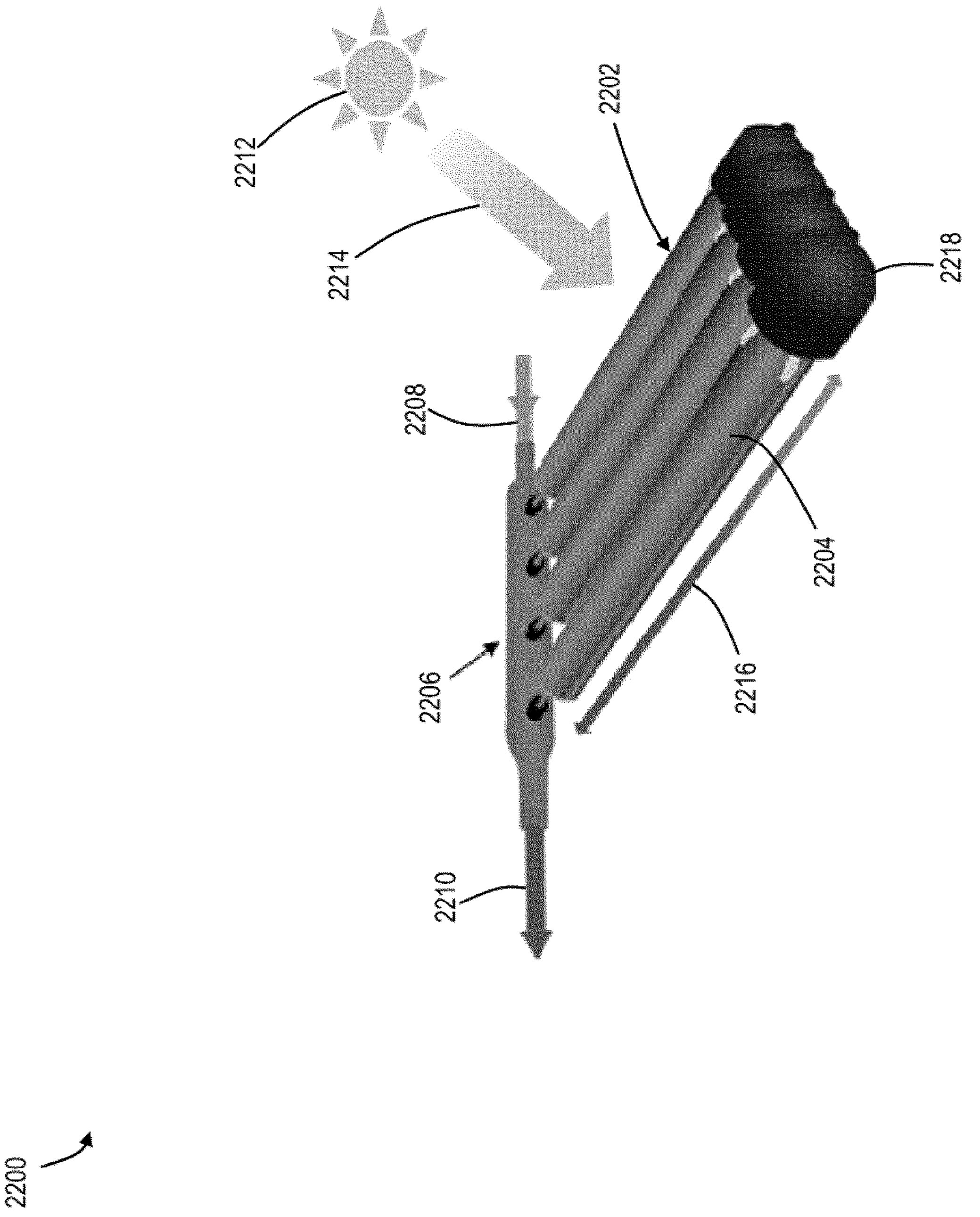
FIG. 22 is a schematic diagram of a heating tube system, according to an embodiment.

Referring now to FIG. 22, shown therein is a heating tube system 2200 according to an embodiment. The heating tube system 2200, or components thereof, may be used in the heating system 2100 of FIG. 21 or the solar collector 2000 of FIG. 20.

The system 2200 includes an evacuated tube array 2202 including a plurality of evacuated tubes 2204. Each evacuated tube 2204 may include a heat pipe (not shown). Each of the evacuated tubes 2204 in the evacuated tube array 2202 connects to a copper manifold 2206. The copper manifold 2206 is a heat exchanger. For example, cold fluid (e.g. water) may be input 2208 into the copper manifold 2206, the fluid travels through the copper manifold 2206, is heated, and exits as a heated output 2210.

A solar radiation source 2212 provides solar radiation 2214 to the evacuated tube array 2202.

The heat pipes in the evacuated tubes 2204 provide a heat transfer 2216. The heat transfer 2216 transfers heat toward the copper manifold 2206, which is used to heat the cold fluid input 2208.

Figure 23:
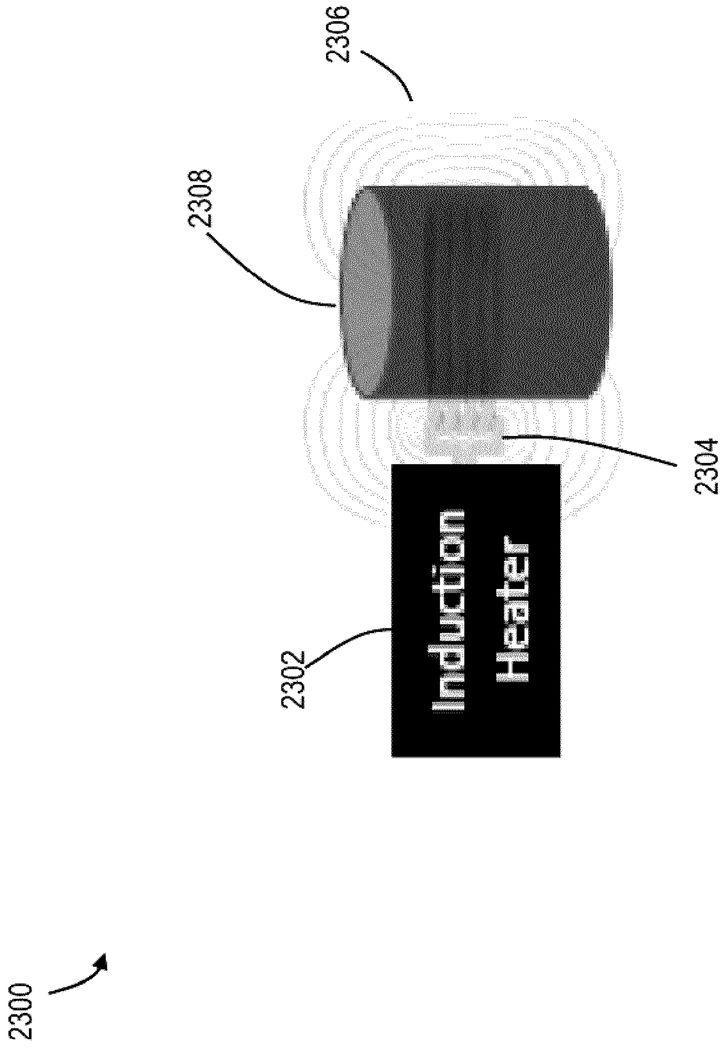
FIG. 23 is a schematic representation of inductive heating of a three dimensional structure at an end of a heating tube, according to an embodiment.

The evacuated tubes 2204 may include a cap (3D structure) 2218 at the end of the tube 2204 that can be volumetrically heated. For example, the cap 2218 may be volumetrically heated via inductive heating. An example of inductive heating is shown in FIG. 23. The inductive heating 2300 is performed using an inductive heater 2302 which includes a magnetic coil 2304. The inductive heater 2302 may also include an electronic oscillator for passing a high-frequency alternating current through the magnetic coil 2304. The magnetic coil 2304 generates magnetic field 2306. The induction heater 2302 is used to heat pipe 2308 (e.g. evacuated tube 2204).

Figure 24:
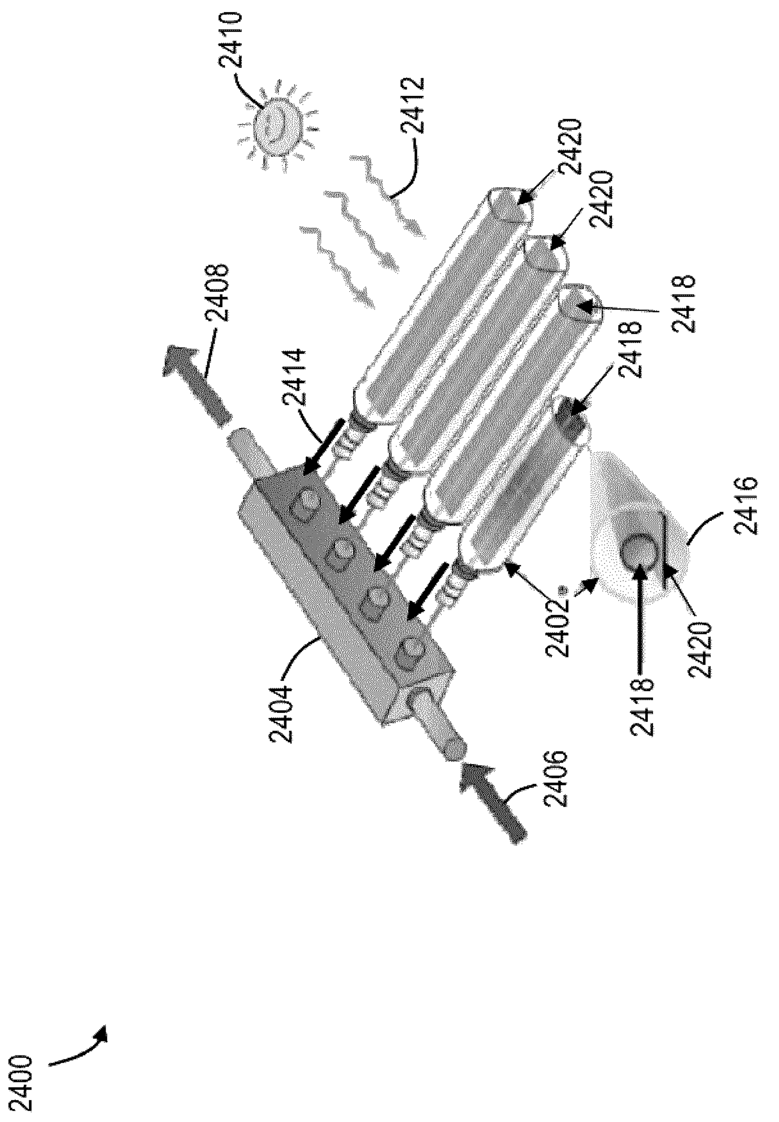
FIG. 24 is a schematic diagram of a heating tube system, according to an embodiment.

Referring now to FIG. 24, shown therein is a heating tube system 2400, according to an embodiment. The heating tube system 2300, or components thereof, may be used in the heating system 2100 of FIG. 21 or the solar collector 2000 of FIG. 20.

The system 2400 includes a plurality of evacuated tubes 2402, a copper manifold (heat exchanged) 2404, cold fluid input 2406, heated fluid output 2408, and a solar radiation source 2410 which emits solar radiation 2412. The components 2402-2412 of system 2400 function similarly to the counterpart components in FIG. 22.

The evacuated tube 2402 is exposed to the solar radiation 2412 and provides a heat transfer 2414 to the copper manifold 2404.

Each evacuated tubes 2402 includes an outer tube 2416 and a heat pipe 2418 and a nanothermite/energetic particle absorber plate 2420 disposed in the interior of the outer tube 2416. The absorber plate 2420 includes a coating to maximize heat collecting efficiency.

Figure 25:
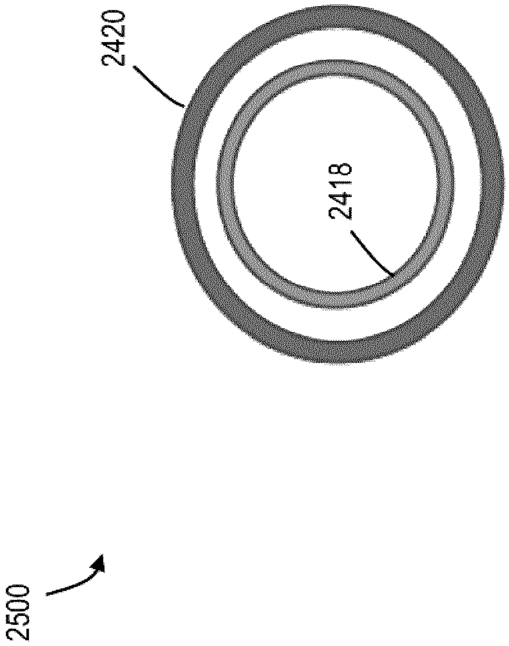
FIG. 25 is a graphical representation of a nanothermite/energetic particle absorber ring for use in the heating tube system of FIG. 24, according to an embodiment.

An example configuration 2500 of the absorber plate 2420 and the heat pipe 2418 is shown in FIG. 25, according to an embodiment. The absorber plate 2420 is in the form of an absorber ring.

Figure 26:
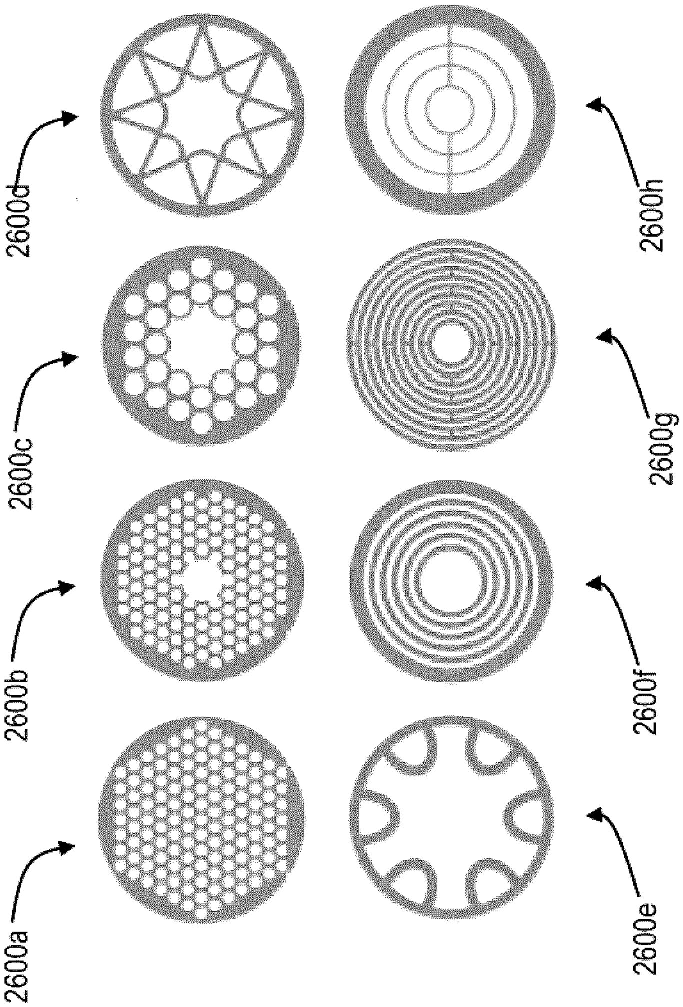
FIG. 26 is a schematic representation of various possible configurations of three dimensional structure to be implemented in a heat pipe of the heating tube system of FIG. 24, according to an embodiment.

Various example heat pipe configurations **2600*a*-2600*h* (e.g. for heat pipe 2418) are shown in FIG. 26**, according to embodiments. In some cases, the configurations may represent a 3D structure for all of the heat pipes for a working fluid to flow through. In some cases, the heat pipe configurations may represent a 3D structure added to the end of the heat pipe to augment the heating.

While the above description provides examples of one or more apparatus, methods, or systems, it will be appreciated that other apparatus, methods, or systems may be within the scope of the claims as interpreted by one of skill in the art.

The invention claimed is:

1. A system for inductive heating of dispersed metallic particles, the system comprising:

a particle-laden flow including a carrier phase comprising a carrier fluid and a dispersed phase comprising the dispersed metallic particles, wherein the dispersed metallic particles include a soft binder component for cohesion and flow and a hard particulate component;

an inductive heating subsystem for inductively heating the dispersed metallic particles, the inductive heating subsystem comprising a magnetic field generator for generating a magnetic field for heating the dispersed metallic particles via at least one of hysteresis and Joule heating mechanisms; and a control unit for controlling an operating parameter of the inductive heating subsystem to control a flow parameter of the particle-laden flow, the flow parameter being any one or more of an induction heating timescale, a particle thermal timescale, a heat diffusion in the carrier phase, and a particle clustering of the dispersed metallic particles.

2. The system of claim 1, wherein the magnetic field generator includes an electromagnetic coil for generating a high frequency external alternating magnetic field.

3. The system of claim 1, wherein the flow parameter is controlled according to an induction heating model, the induction heating model including model parameters including the induction heating timescale, an initial temperature of the dispersed metallic particles, and a Curie temperature of the dispersed metallic particles, wherein the initial temperature and the Curie temperature are known and the induction heating timescale is a user-defined model parameter, and wherein the flow parameter is controlled according to an induction heating model represented by:

$$T_p = T_{p0} + (T_{Curie} - T_p)\left(1 - e^{-t/\tau_{ind}}\right),$$

wherein $T_{p0}$ is the initial temperature of the dispersed metallic particles, $T_{Curie}$ is the Curie temperature, and $T_{ind}$ is the induction heating timescale.

4. The system of claim 1, wherein the operating parameter is an alternating current magnetic field frequency or an alternating current magnetic field magnitude.

5. The system of claim 1, wherein the operating parameter is a frequency of the magnetic field, and wherein the control unit adjusts the frequency to decrease the induction heating timescale to produce a more homogeneous thermal distribution of the carrier fluid.

6. A method of inductive heating of dispersed metallic particles, the method comprising:

providing a particle-laden flow comprising a carrier phase comprising a carrier fluid and a dispersed phase comprising the dispersed metallic particles, wherein the dispersed metallic particles include a soft binder component for cohesion and flow and a hard particulate component;

exposing the dispersed metallic particles to a magnetic field for heating the dispersed metallic particles via at least one of hysteresis and Joules heating mechanisms;

inductively heating the dispersed metallic particles in the particle-laden flow via the magnetic field; and controlling a flow configuration of the particle-laden flow by adjusting a flow parameter, the flow parameter being any one or more of an induction heating timescale, a particle thermal timescale, a heat diffusion in the carrier phase, and a particle clustering of the dispersed metallic particles.

7. The method of claim 6, wherein adjusting the flow parameter includes adjusting the flow parameter according to an induction heating model, the induction heating model including model parameters including the induction heating timescale, an initial temperature of the dispersed metallic particles, and a Curie temperature of the dispersed metallic particles, wherein the initial temperature and the Curie temperature are known and the induction heating timescale is a user-defined model parameter, and adjusting the flow parameter according to an induction heating model represented by:

$$T_p = T_{p0} + (T_{Curie} - T_p)\left(1 - e^{-t/\tau_{ind}}\right),$$

wherein $T_{p0}$ is the particle initial temperature, $T_{Curie}$ is the Curie temperature, and $\tau_{ind}$ is the induction heating timescale.

8. The method of claim 7, further comprising varying the inductive heating of the dispersed metallic particles by adjusting a parameter of the magnetic field, the parameter being an alternating current magnetic field frequency, an alternating current magnetic field magnitude, a magnetic coil size, or a magnetic coil geometry.

9. The method of claim 6, wherein adjusting the flow parameter includes adjusting the flow parameter according to an induction heating model, wherein the induction heating timescale is a model parameter of the induction heating model, and wherein the induction heating timescale is the only model parameter that is user-defined.

10. The method of claim 6, wherein adjusting the flow parameter includes imparting by a frequency of the magnetic field a decrease in the induction heating timescale and the particle thermal timescale to produce a more homogeneous thermal distribution of the carrier fluid.

11. The method of claim 6, where adjusting the flow parameter includes increasing the particle thermal timescale for the dispersed phase to impede heat transfer from the dispersed phase to the carrier phase.

12. The method of claim 6, wherein adjusting the flow parameter includes decreasing the particle thermal timescale to increase a heat transfer rate for rapidly transferring heat from the dispersed phase to the carrier phase to produce a more homogeneous fluid temperature distribution.

13. The method of claim 6, wherein adjusting the flow parameter includes decreasing the particle thermal response time to increase heat transfer from the dispersed phase to the carrier phase to make the particle-laden flow more thermally homogeneous.

14. The method of claim 6, wherein adjusting the flow parameter includes increasing the particle thermal timescale to reduce heat transfer to the carrier phase.

15. The method of claim 6, wherein adjusting the flow parameter includes increasing the particle thermal response time to reduce an amount of heat transferred from the dispersed metallic particles to the carrier fluid.

16. The method of claim 6, further comprising using the particle-laden flow as a fuel, selecting the dispersed metallic particles based on the dispersed metallic particles having a Curie temperature above a reaction ignition point of the particle-laden flow, and wherein the inductively heating the dispersed metallic particles includes inductively heating and igniting the dispersed metallic particles in a turbulent flow field.

17. The method of claim 6, wherein controlling the flow configuration includes controlling carrier fluid and dispersed metallic particle characteristics at an ignition point of the particle-laden flow for an efficient combustion.

18. The method of claim 6, wherein adjusting the flow parameter includes reducing inhomogeneities in either the dispersed phase or the carrier phase to improve combustion behaviour of the particle-laden flow.

19. The method of claim 6, further comprising using the particle-laden flow as a fuel, and wherein controlling the flow configuration includes optimizing the flow configuration at an ignition point of the fuel to obtain a homogeneous heat release and distribution.

20. The method of claim 6, wherein adjusting the flow parameter includes decreasing the induction heating timescale to decrease the particle clustering and increase a heating rate.

* * * * *